United States Patent
Hosseini et al.

(10) Patent No.: US 12,426,039 B2
(45) Date of Patent: Sep. 23, 2025

(54) TECHNIQUES FOR CHANNEL ESTIMATION

(71) Applicant: QUALCOMM Incorporated, San Diego, CA (US)

(72) Inventors: Seyedkianoush Hosseini, San Diego, CA (US); Wanshi Chen, San Diego, CA (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 365 days.

(21) Appl. No.: 17/948,093

(22) Filed: Sep. 19, 2022

(65) Prior Publication Data
US 2023/0010455 A1 Jan. 12, 2023

Related U.S. Application Data

(62) Division of application No. 16/380,734, filed on Apr. 10, 2019, now Pat. No. 11,477,809.
(Continued)

(51) Int. Cl.
*H04L 25/00* (2006.01)
*H04L 25/02* (2006.01)
*H04W 72/1268* (2023.01)

(52) U.S. Cl.
CPC ..... *H04W 72/1268* (2013.01); *H04L 25/0202* (2013.01)

(58) Field of Classification Search
CPC .......... H04W 72/1268; H04L 25/0202; H04L 5/0094; H04L 5/0053; H04L 5/0058;
(Continued)

(56) References Cited

U.S. PATENT DOCUMENTS

| 9,136,997 B2 | 9/2015 | Gaal et al. |
| 10,721,038 B2 | 7/2020 | Kwak et al. |

(Continued)

FOREIGN PATENT DOCUMENTS

| CN | 101436892 A | 5/2009 |
| CN | 103597753 A | 2/2014 |

(Continued)

OTHER PUBLICATIONS

Ericsson et al. (On the operation with different TTI lengths, R1-1610331, Oct. 2016).*

(Continued)

*Primary Examiner* — Lakeram Jangbahadur
(74) *Attorney, Agent, or Firm* — Holland & Hart LLP

(57) ABSTRACT

Techniques are described herein for performing channel estimation for both uplink and downlink channels. Additional reference signals may be allocated or assigned to various resource elements (REs) of a transmission time interval (TTI). The receiving device (e.g., a base station or a user equipment (UE)) may be configured to use the additional reference signals during channel estimation. The use of additional reference signals may improve the accuracy of the channel estimations. In downlink communications, a base station may allocate one or more channel state information reference signals (CSI-RSs) to a port of a UE. In uplink communications, a UE may transmit several sounding reference signals (SRSs) in a group.

19 Claims, 21 Drawing Sheets

Related U.S. Application Data

(60) Provisional application No. 62/656,535, filed on Apr. 12, 2018.

(58) Field of Classification Search
CPC ... H04L 5/0064; H04L 5/0051; H04L 5/0023; H04B 7/0684
See application file for complete search history.

(56) References Cited

U.S. PATENT DOCUMENTS

| | | |
|---|---|---|
| 2009/0175232 A1 | 7/2009 | Kolding |
| 2012/0020230 A1 | 1/2012 | Chen et al. |
| 2013/0194931 A1 | 8/2013 | Lee et al. |
| 2014/0092827 A1 | 4/2014 | Jongren et al. |
| 2014/0269451 A1 | 9/2014 | Papasakellariou et al. |
| 2014/0269460 A1 | 9/2014 | Papasakellariou et al. |
| 2015/0236801 A1 | 8/2015 | Sun et al. |
| 2016/0150548 A1 | 5/2016 | Wu et al. |
| 2016/0366696 A1 | 12/2016 | Åhlander et al. |
| 2017/0202014 A1 | 7/2017 | Moon et al. |
| 2017/0230994 A1 | 8/2017 | You et al. |
| 2017/0238312 A1 | 8/2017 | Chen et al. |
| 2017/0264407 A1 | 9/2017 | Hwang et al. |
| 2017/0332359 A1 | 11/2017 | Tsai et al. |
| 2017/0366377 A1* | 12/2017 | Papasakellariou .... H04L 5/0053 |
| 2018/0054800 A1 | 2/2018 | Yeo et al. |
| 2018/0103462 A1 | 4/2018 | Yeo et al. |
| 2018/0132229 A1 | 5/2018 | Li |
| 2018/0145797 A1 | 5/2018 | Yeo et al. |
| 2018/0183552 A1* | 6/2018 | Hosseini ............... H04L 5/0082 |
| 2018/0270699 A1 | 9/2018 | Babaei et al. |
| 2018/0324771 A1 | 11/2018 | Hosseini et al. |
| 2019/0036671 A1 | 1/2019 | Wu et al. |
| 2019/0123864 A1 | 4/2019 | Zhang et al. |
| 2019/0124656 A1 | 4/2019 | Yerramalli et al. |
| 2019/0190763 A1* | 6/2019 | Takeda ................ H04L 27/2602 |
| 2019/0223228 A1 | 7/2019 | Ko et al. |
| 2019/0229789 A1 | 7/2019 | Zhang et al. |
| 2019/0320453 A1 | 10/2019 | Hosseini et al. |
| 2020/0022112 A1* | 1/2020 | Yasukawa ............ H04W 72/21 |
| 2020/0083938 A1 | 3/2020 | Park et al. |
| 2021/0127360 A1 | 4/2021 | Noh et al. |
| 2022/0393812 A1* | 12/2022 | Fehrenbach ........ H04L 27/2628 |

FOREIGN PATENT DOCUMENTS

| | | |
|---|---|---|
| CN | 105075359 A | 11/2015 |
| CN | 105580468 A | 5/2016 |
| CN | 105991222 A | 10/2016 |
| CN | 107852301 A | 3/2018 |
| EP | 2023504 A2 * | 2/2009 ............ H04B 7/061 |
| EP | 2849481 A1 | 3/2015 |
| EP | 3496486 A1 * | 6/2019 ............ B41J 29/36 |
| WO | WO-2011140264 A1 | 11/2011 |
| WO | WO-2013052104 A1 | 4/2013 |
| WO | WO-2018017187 A1 | 1/2018 |
| WO | WO2018025949 A1 | 2/2018 |
| WO | WO-2018029106 A1 * | 2/2018 .......... H04B 7/0417 |
| WO | WO2018118532 A1 | 6/2018 |
| WO | WO2018201908 | 11/2018 |
| WO | WO2019051634 | 3/2019 |
| WO | WO2019052407 | 3/2019 |

OTHER PUBLICATIONS

European Search Report—EP23179057—Search Authority—The Hague—Oct. 9, 2023 (182599EPD1).

ZTE Corporation, et al., "Enhancements on Beamformed CSI-RS", 3GPP TSG RAN WG1 Meeting #85, R1-164310, 3rd Generation Partnership Project (3GPP), Mobile Competence Centre, 650, Route Des Lucioles, F-06921 Sophia-Antipolis Cedex, France, vol. RAN WG1, No. Nanjing, China, May 23, 2016-May 27, 2016, May 14, 2016, XP051096493, 6 pages.

ERICSSON: "On CSI Measurement", 3GPP TSG-RAN WG1 #90bis, 3GPP Draft, R1-1718431 on CSI Measurement, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), 12 Pages, XP051341613, Retrieved from the Internet: URL: http://www.3gpp.orgjftp/Meetings_3GPP_SYNC/RAN1/Docs/.

ERICSSON: "On the Operation with Different TTI Lengths," 3GPP Draft; R1-1610331, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 9, 2016, XP051150346, 8 pages, Retrieved from the Internet: URL: http://www.3gpp.org/ftp/Meetings_3GPP_SYNC/RAN1/Docs/ [retrieved on Oct. 9, 2016] Sect.s 2.2.1, 2.2.2 figure 2.

International Preliminary Report on Patentability—PCT/US2019/026950, The International Bureau of WIPO—Geneva, Switzerland, Oct. 22, 2020.

International Search Report and Written Opinion—PCT/US2019/026950—ISA/EPO—Dec. 10, 2019.

Partial International Search Report—PCT/US2019/026950—ISA/EPO—Aug. 21, 2019.

Session Chair (Samsung): "Chairman's Notes for AI 7.2 NR-MIMO", R1-1721657, 3GPP TSG RAN WG1 Meeting 91 Reno, USA, Nov. 27-Dec. 1, 2017, XP51370740, 38 Pages.

* cited by examiner

TECHNIQUES FOR CHANNEL ESTIMATION

CROSS REFERENCE

The present Application for Patent is a Divisional of U.S. patent application Ser. No. 16/380,734 by Hosseini et al., entitled "Techniques for Channel Estimation" filed Apr. 10, 2019, which claims the benefit of U.S. Provisional Patent Application No. 62/656,535 by Hosseini et al., entitled "Techniques for Channel Estimation," filed Apr. 12, 2018, assigned to the assignee hereof, and expressly incorporated by reference in its entirety herein.

BACKGROUND

The following relates generally to wireless communication, and more specifically to techniques for channel estimation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems support applications that are sensitive to channel conditions. To operate such applications without experiencing failures or problems, more robust and accurate channel estimations may be desired.

SUMMARY

The described techniques relate to improved methods, systems, devices, or apparatuses that support techniques for channel estimation. Generally, the described techniques provide for performing channel estimation for both uplink and downlink channels. Additional reference signals may be allocated or assigned to various resource elements (REs) of a transmission time interval (TTI). The receiving device (e.g., a base station, a user equipment (UE)) may be configured to use the additional reference signals during channel estimation to improve accuracy and prevent or mitigate experiencing failures. In downlink communications, a base station may allocate one or more channel state information reference signals (CSI-RSs) to a port of a UE. In uplink communications, a UE may transmit one or more sounding reference signals (SRSs) in a group.

A method for wireless communication is described. The method may include allocating a plurality of CSI-RS REs of a TTI to a port of a UE, transmitting, to the UE, an indication of the plurality of CSI-RS REs allocated to the port of the UE, and transmitting at least one CSI-RS to the UE during the TTI.

An apparatus for wireless communication is described. The apparatus may include means for allocating a plurality of CSI-RS REs of a TTI to a port of a UE, means for transmitting, to the UE, an indication of the plurality of CSI-RS REs allocated to the port of the UE, and means for transmitting at least one CSI-RS to the UE during the TTI.

Another apparatus for wireless communication is described. The apparatus may include a processor, memory in electronic communication with the processor, and instructions stored in the memory. The instructions may be operable to cause the processor to allocate a plurality of CSI-RS REs of a TTI to a port of a UE, transmit, to the UE, an indication of the plurality of CSI-RS REs allocated to the port of the UE, and transmit at least one CSI-RS to the UE during the TTI.

A non-transitory computer-readable medium for wireless communication is described. The non-transitory computer-readable medium may include instructions operable to cause a processor to allocate a plurality of CSI-RS REs of a TTI to a port of a UE, transmit, to the UE, an indication of the plurality of CSI-RS REs allocated to the port of the UE, and transmit at least one CSI-RS to the UE during the TTI.

Some examples of the method, apparatus, and non-transitory computer-readable medium described above may further include processes, features, means, or instructions for identifying a channel estimation accuracy for a communication with the UE, where allocating the plurality of CSI-RS REs to the port of the UE may be based at least in part on identifying the channel estimation accuracy.

In some examples of the method, apparatus, and non-transitory computer-readable medium described above, allocating the CSI-RS REs to the UE may further include processes, features, means, or instructions for allocating the CSI-RS REs in the TTI such that a ratio of the CSI-RS REs and a number of ports of the UE may be greater than one-to-one.

In some examples of the method, apparatus, and non-transitory computer-readable medium described above, allocating the CSI-RS REs to the UE may further include processes, features, means, or instructions for allocating at least two CSI-RS REs of the plurality of CSI-RS REs to the port of the UE in different symbols of the TTI.

In some examples of the method, apparatus, and non-transitory computer-readable medium described above, allocating the CSI-RS REs to the UE may further include processes, features, means, or instructions for allocating at least two CSI-RS REs of the plurality of CSI-RS REs to the port of the UE in different radio frequency spectrum bands of the TTI within the same resource block.

In some examples of the method, apparatus, and non-transitory computer-readable medium described above, allocating the CSI-RS REs to the UE may further include processes, features, means, or instructions for allocating at least two CSI-RS REs of the plurality of CSI-RS REs to the port of the UE in different symbols of the TTI.

Some examples of the method, apparatus, and non-transitory computer-readable medium described above may further include processes, features, means, or instructions for identifying a channel condition of a communication link with the UE, where allocating the plurality of CSI-RS REs to the port of the UE may be based at least in part on identifying the channel condition.

Some examples of the method, apparatus, and non-transitory computer-readable medium described above may further include processes, features, means, or instructions for identifying that the UE may be configured with ultra-reliable low-latency communications (URLLC) information, where allocating the plurality of CSI-RS REs to the port of the UE may be based at least in part on identifying that the UE may be configured with URLLC information.

In some examples of the method, apparatus, and non-transitory computer-readable medium described above, the indication may be included in a radio resource control (RRC) message.

Some examples of the method, apparatus, and non-transitory computer-readable medium described above may further include processes, features, means, or instructions for determining the CSI-RS REs in the TTI based at least in part on a preconfigured mapping, where allocating the CSI-RS REs to the UE may be based at least in part on determining the CSI-RS REs in the TTI.

A method of wireless communication is described. The method may include identifying, by a UE, an allocation of a plurality of CSI-RS REs of a TTI to a port of the UE, performing a channel estimation using the plurality of CSI-RS REs allocated to the port of the UE based at least in part on identifying the allocation of the plurality CSI-RS REs to the port of the UE, and transmitting a channel state information (CSI) report to a base station based at least in part on performing the channel estimation.

An apparatus for wireless communication is described. The apparatus may include means for identifying, by a UE, an allocation of a plurality of CSI-RS REs of a TTI to a port of the UE, means for performing a channel estimation using the plurality of CSI-RS REs allocated to the port of the UE based at least in part on identifying the allocation of the plurality CSI-RS REs to the port of the UE, and means for transmitting a channel state information (CSI) report to a base station based at least in part on performing the channel estimation.

Another apparatus for wireless communication is described. The apparatus may include a processor, memory in electronic communication with the processor, and instructions stored in the memory. The instructions may be operable to cause the processor to identify, by a UE, an allocation of a plurality of CSI-RS REs of a TTI to a port of the UE, perform a channel estimation using the plurality of CSI-RS REs allocated to the port of the UE based at least in part on identifying the allocation of the plurality CSI-RS REs to the port of the UE, and transmit a channel state information (CSI) report to a base station based at least in part on performing the channel estimation.

A non-transitory computer-readable medium for wireless communication is described. The non-transitory computer-readable medium may include instructions operable to cause a processor to identify, by a UE, an allocation of a plurality of channel state information reference signal (CSI-RS) REs of a TTI to a port of the UE, perform a channel estimation using the plurality of CSI-RS REs allocated to the port of the UE based at least in part on identifying the allocation of the plurality CSI-RS REs to the port of the UE, and transmit a channel state information (CSI) report to a base station based at least in part on performing the channel estimation.

Some examples of the method, apparatus, and non-transitory computer-readable medium described above may further include processes, features, means, or instructions for identifying that at least two CSI-RS REs of the plurality of CSI-RS REs allocated to the port of the UE may be in different symbols of the TTI, where performing the channel estimation may be based at least in part on identifying that the at least two CSI-RS REs may be in different symbols of the TTI.

Some examples of the method, apparatus, and non-transitory computer-readable medium described above may further include processes, features, means, or instructions for identifying that at least two CSI-RS REs of the plurality of CSI-RS REs allocated to the port of the UE may be in different radio frequency spectrum bands of the TTI, where performing the channel estimation may be based at least in part on identifying that the at least two CSI-RS REs may be in different radio frequency spectrum bands of the TTI.

Some examples of the method, apparatus, and non-transitory computer-readable medium described above may further include processes, features, means, or instructions for identifying that the at least two CSI-RS REs allocated to the port of the UE may be in different symbols of the TTI, where performing the channel estimation may be based at least in part on identifying that the at least two CSI-RS REs may be in different symbols of the TTI.

In some examples of the method, apparatus, and non-transitory computer-readable medium described above, a ratio of CSI-RS REs in the TTI allocated to the UE and a number of ports of the UE may be greater than one-to-one.

Some examples of the method, apparatus, and non-transitory computer-readable medium described above may further include processes, features, means, or instructions for receiving an indication from the base station of the plurality of CSI-RS REs allocated to the port of the UE, where identifying the allocation of the plurality of CSI-RS REs to the port of the UE may be based at least in part on receiving the indication.

In some examples of the method, apparatus, and non-transitory computer-readable medium described above, the indication may be included in a radio resource control (RRC) message received from the base station.

Some examples of the method, apparatus, and non-transitory computer-readable medium described above may further include processes, features, means, or instructions for receiving at least one CSI-RS from the base station during the TTI, where performing the channel estimation may be based at least in part on receiving the at least one CSI-RS.

A method of wireless communication is described. The method may include determining a plurality of SRSs for transmitting during a TTI, assigning a plurality of symbols of the TTI for transmitting the plurality of SRSs based at least in part on determining the plurality of SRSs, and transmitting the plurality of SRSs in the TTI based at least in part on assigning the plurality of symbols.

An apparatus for wireless communication is described. The apparatus may include means for determining a plurality of SRSs for transmitting during a TTI, means for assigning a plurality of symbols of the TTI for transmitting the plurality of SRSs based at least in part on determining the plurality of SRSs, and means for transmitting the plurality of SRSs in the TTI based at least in part on assigning the plurality of symbols.

Another apparatus for wireless communication is described. The apparatus may include a processor, memory in electronic communication with the processor, and instructions stored in the memory. The instructions may be operable to cause the processor to determine a plurality of SRSs for transmitting during a TTI, assign a plurality of symbols of the TTI for transmitting the plurality of SRSs based at least in part on determining the plurality of SRSs, and transmit the plurality of SRSs in the TTI based at least in part on assigning the plurality of symbols.

A non-transitory computer-readable medium for wireless communication is described. The non-transitory computer-readable medium may include instructions operable to cause a processor to determine a plurality of SRSs for transmitting during a TTI, assign a plurality of symbols of the TTI for transmitting the plurality of SRSs based at least in part on determining the plurality of SRSs, and transmit the plurality of SRSs in the TTI based at least in part on assigning the plurality of symbols.

In some examples of the method, apparatus, and non-transitory computer-readable medium described above, assigning the plurality of symbols of the TTI may further include processes, features, means, or instructions for assigning the plurality of symbols of the TTI on a short TTI (sTTI)-by-sTTI basis.

Some examples of the method, apparatus, and non-transitory computer-readable medium described above may further include processes, features, means, or instructions for generating a repetition window indicating a number of symbols to use to transmit the plurality of SRSs, where assigning the plurality of symbols may be based at least in part on the repetition window.

In some examples of the method, apparatus, and non-transitory computer-readable medium described above, the repetition window includes a first portion of symbols in a first subframe and a second portion of symbols in a second subframe, and where transmitting the plurality of SRSs may further include processes, features, means, or instructions for transmitting the plurality of SRSs in a plurality of subframes that include the first subframe and the second subframe.

In some examples of the method, apparatus, and non-transitory computer-readable medium described above, the plurality of SRSs may be associated with a first channel for URLLC, the first channel having a first channel length.

Some examples of the method, apparatus, and non-transitory computer-readable medium described above may further include processes, features, means, or instructions for identifying a second channel having a second channel length longer than the first channel length, where the second channel including information for transmitting using at least some of the same symbols as the plurality of SRSs. Some examples of the method, apparatus, and non-transitory computer-readable medium described above may further include processes, features, means, or instructions for determining at least some content of the information for transmitting using the second channel, where transmitting the plurality of SRSs may be based at least in part on determining the at least some content of the information to be transmitted using the second channel.

In some examples of the method, apparatus, and non-transitory computer-readable medium described above, the plurality of SRSs may be transmitted based at least in part on the content of the second channel being exclusive of an acknowledgement or a negative acknowledgement of a hybrid automatic repeat request (HARQ), a demodulation reference signal (DMRS), or a combination thereof.

Some examples of the method, apparatus, and non-transitory computer-readable medium described above may further include processes, features, means, or instructions for identifying a second channel having a second channel length equal to the first channel length, the second channel including information to be transmitted using at some of the same symbols as the plurality of SRSs. Some examples of the method, apparatus, and non-transitory computer-readable medium described above may further include processes, features, means, or instructions for applying one or more power scaling rules to the plurality of SRSs based at least in least in part on identifying that the second channel may have the second channel length equal to the first channel length, where transmitting the plurality of SRSs may be based at least in part on applying the one or more power scaling rules. Some examples of the method, apparatus, and non-transitory computer-readable medium described above may further include processes, features, means, or instructions for determining at least some content of the information to be transmitted using the second channel, where transmitting the plurality of SRSs may be based at least in part on determining the at least some content of the information to be transmitted using the second channel.

Some examples of the method, apparatus, and non-transitory computer-readable medium described above may further include processes, features, means, or instructions for applying the one or more power scaling rules to the plurality of SRSs may be based at least in part on the content of the second channel including an acknowledgement or a negative acknowledgement of a hybrid automatic repeat request (HARQ), a demodulation reference signal (DMRS), or a combination thereof.

In some examples of the method, apparatus, and non-transitory computer-readable medium described above, assigning a plurality of symbols of the TTI may further include processes, features, means, or instructions for assigning the plurality of symbols of the TTI on a symbol-by-symbol basis.

Some examples of the method, apparatus, and non-transitory computer-readable medium described above may further include processes, features, means, or instructions for receiving downlink control information from a base station, where determining to transmit the plurality of SRSs may be based at least in part on receiving the downlink control information.

In some examples of the method, apparatus, and non-transitory computer-readable medium described above, the downlink control information includes short downlink control information associated with URLLC.

Some examples of the method, apparatus, and non-transitory computer-readable medium described above may further include processes, features, means, or instructions for determining a number of transmissions of the plurality of SRSs in the TTI, where assigning the plurality of symbols may be based at least in part on determining the number of transmissions.

Some examples of the method, apparatus, and non-transitory computer-readable medium described above may further include processes, features, means, or instructions for identifying a channel estimation accuracy for a communication with a base station, where assigning the plurality of symbols may be based at least in part on identifying the channel estimation accuracy.

Some examples of the method, apparatus, and non-transitory computer-readable medium described above may further include processes, features, means, or instructions for identifying a channel condition of a communication link with a base station, where assigning the plurality of symbols may be based at least in part on identifying the channel condition.

A method of wireless communication is described. The method may include receiving, by a base station, a plurality of SRSs from a UE during a TTI, performing a channel estimation using the plurality of SRSs received from the UE, and allocating resources to the UE based at least in part on performing the channel estimation.

An apparatus for wireless communication is described. The apparatus may include means for receiving, by a base station, a plurality of SRSs from a UE during a TTI, means for performing a channel estimation using the plurality of SRSs received from the UE, and means for allocating resources to the UE based at least in part on performing the channel estimation.

Another apparatus for wireless communication is described. The apparatus may include a processor, memory in electronic communication with the processor, and instructions stored in the memory. The instructions may be operable to cause the processor to receive, by a base station, a plurality of SRSs from a UE during a TTI, perform a channel estimation using the plurality of SRSs received from the UE, and allocate resources to the UE based at least in part on performing the channel estimation.

A non-transitory computer-readable medium for wireless communication is described. The non-transitory computer-readable medium may include instructions operable to cause a processor to receive, by a base station, a plurality of SRSs from a UE during a TTI, perform a channel estimation using the plurality of SRSs received from the UE, and allocate resources to the UE based at least in part on performing the channel estimation.

Some examples of the method, apparatus, and non-transitory computer-readable medium described above may further include processes, features, means, or instructions for receiving a first set of SRSs of the plurality of SRSs in a first subframe and a second set of SRSs of the plurality of SRSs in a second subframe, where performing the channel estimation may be based at least in part on the first set of SRSs in the first subframe and the second set of SRSs in the second subframe.

In some examples of the method, apparatus, and non-transitory computer-readable medium described above, the plurality of symbols of the TTI may be assigned on an sTTI-by-sTTI basis.

Some examples of the method, apparatus, and non-transitory computer-readable medium described above may further include processes, features, means, or instructions for transmitting downlink control information to the UE, where determining the plurality of SRSs for transmitting may be based at least in part on receiving the downlink control information.

In some examples of the method, apparatus, and non-transitory computer-readable medium described above, the downlink control information includes short downlink control information.

DETAILED DESCRIPTION

Some wireless communications systems support applications that are sensitive to channel conditions. For example, directional communication links using directional beams may be sensitive to changes in channel conditions or traffic with certain parameters (e.g., Quality of Service (QOS)) or may be sensitive to changes in channel conditions (e.g., ultra-reliable low-latency communications (URLLC)). To operate such applications without experiencing failures, accurate channel estimations may be obtained.

Techniques are described herein for performing channel estimation for channels (e.g., uplink channels, downlink channel). Additional reference signals may be allocated or assigned to various resource elements (REs) of a transmission time interval (TTI). The receiving device (e.g., a base station, a user equipment (UE)) may be configured to use the additional reference signals during channel estimation. The use of additional reference signals may improve the accuracy of the channel estimations. In downlink communications, as one example, a base station may allocate one or more channel state information reference signals (CSI-RSs) to a port of a UE. In uplink communications, as another example, a UE may transmit one or more sounding reference signals (SRSs) in a group.

Aspects of the disclosure are initially described in the context of a wireless communications system. Aspects of the disclosure are also described in the context of resource structures and process flows. Aspects of the disclosure are further illustrated by and described with reference to apparatus diagrams, system diagrams, and flowcharts that relate to techniques associated with channel estimation.

Figure 1:
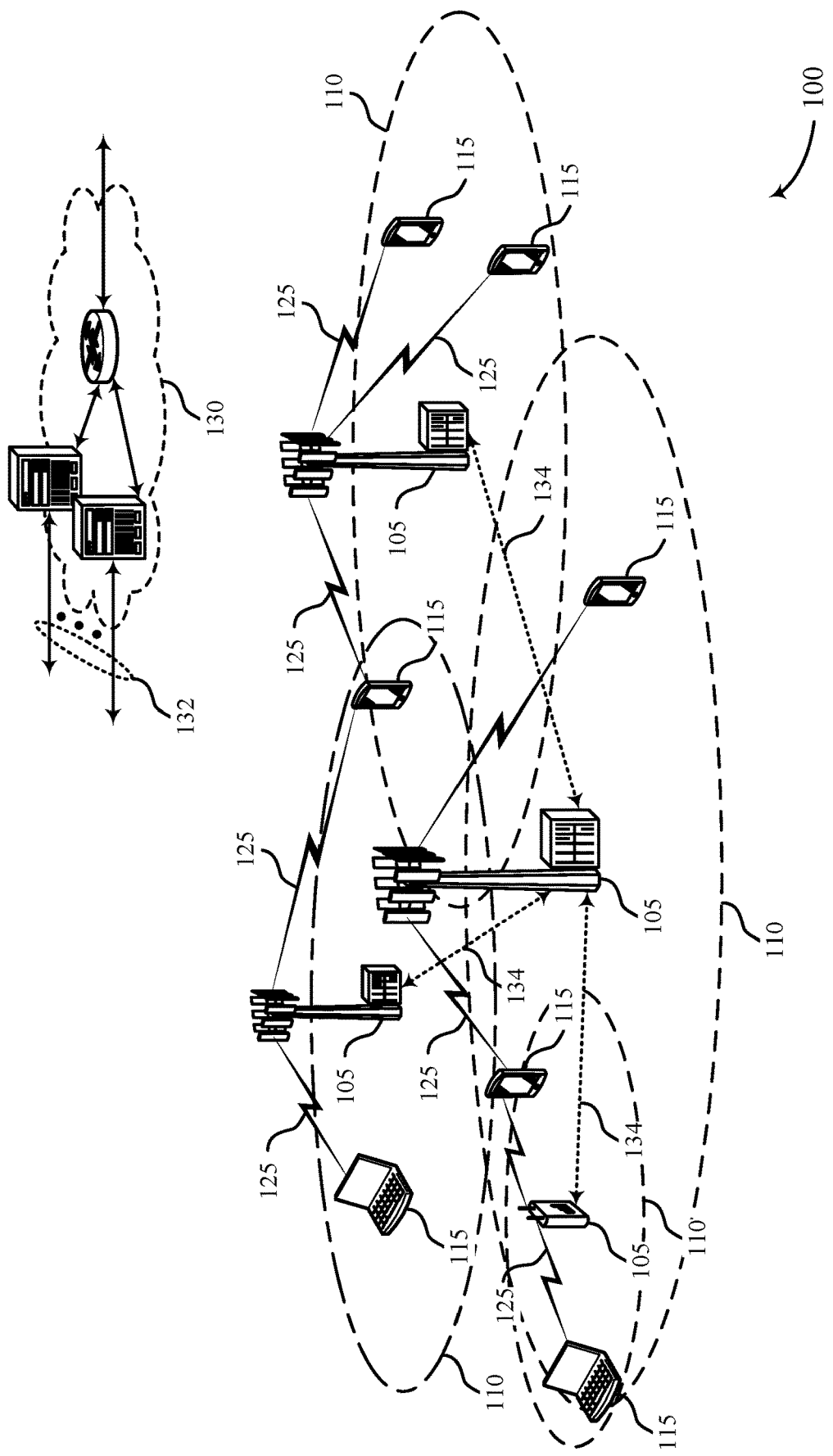
FIGS. 1 and 2 illustrate examples of wireless communications systems that support techniques for channel estimation in accordance with aspects of the present disclosure.

FIG. 1 illustrates an example of a wireless communications system 100 that supports techniques for channel estimation in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some examples, UEs 115 may be designed to support critical functions (e.g., mission critical functions), and a wireless communications system 100 may be configured to provide ultra-reliable communications for these functions.

In some examples, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some examples, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some examples, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of a signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some examples, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some examples, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may In some examples perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some examples, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some examples, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some examples, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency divisional multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs that may support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some examples, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some examples, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some examples, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some examples, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

The receiving device (e.g., a base station 105 or a UE 115) may be configured to use additional reference signals (in addition to those used during other procedures or operations) during channel estimation and thereby may improve the accuracy of the channel estimations. In downlink communications, as an example, a base station 105 may allocate one or more CSI-RSs to a port of a UE. In uplink communications, as an example, a UE may transmit one or more (e.g., several) SRSs in a group.

Figure 2:
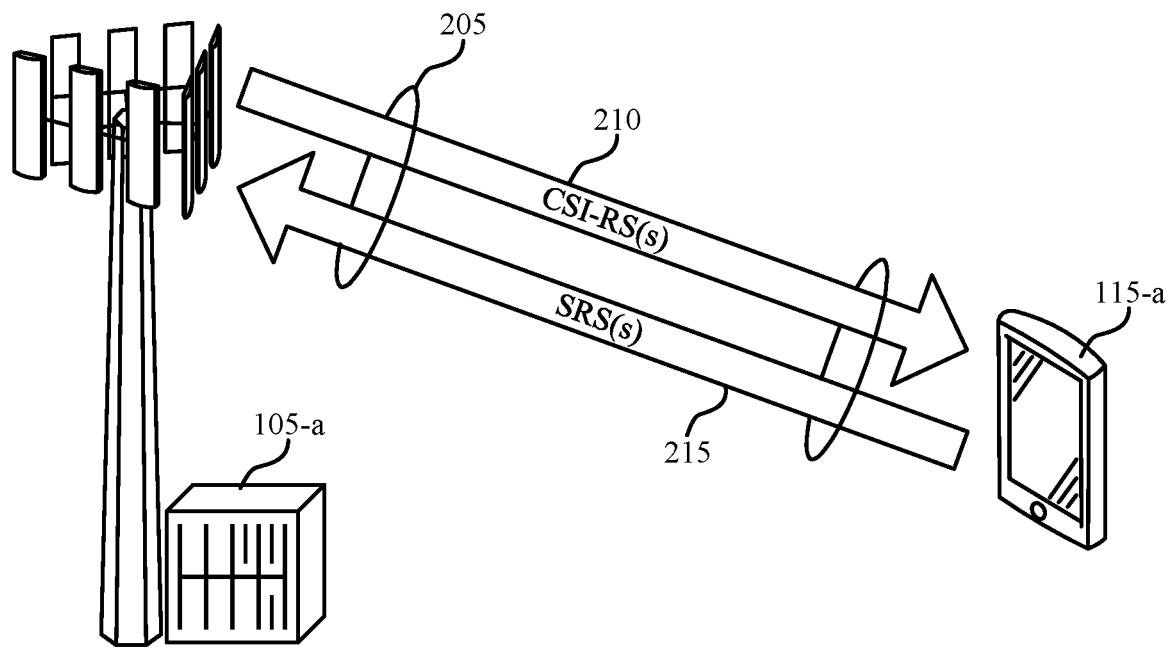

FIG. 2 illustrates an example of a wireless communications system 200 that supports techniques for channel estimation in accordance with aspects of the present disclosure. In some examples, the wireless communications system 200 may implement aspects of wireless communications system 100. The wireless communications system 200 may facilitate communications between various nodes in the system. For example, the wireless communications system 200 may include a base station 105-a and a UE 115-a.

The wireless communications system 200 may support communications having different traffic types or different QoS parameters (e.g., requirements). For example, the wireless communications system 200 may be configured to communicate URLLC information. In some examples, the wireless communications system 200 may support URLLC traffic having different parameters or constraints. For example, a first type of URLLC traffic may require a first reliability (e.g., a reliability of 10^-5) with a delay bound of a first length (e.g., 1 ms) and a second type of URLLC traffic may require a second reliability (e.g., a reliability of 10^-4) with a delay bound of a second length (e.g., 10 ms).

To meet the QoS parameters of packets communicated in the wireless communications system, the wireless communications system 200 may be configured to make accurate and up-to-date channel state information or channel estimation available to the various nodes (e.g., base station 105-a or UE 115-a) of the wireless communications system 200. Techniques are described herein for performing channel estimation and determining channel state information (e.g., for uplink and downlink channels). The techniques described herein may provide for a higher quality of channel estimation over other wireless communications systems (e.g., LTE). Accurate and up-to-date channel estimation may be used for URLLC communications or may be used for any other types of communications supported by the wireless communications system 200.

To perform channel estimation, nodes (e.g., base station 105-a or UE 115-a) may exchange the reference signals 205. The receiving node may measure characteristics of the received reference signals 205, compare those measurements to expected values or transmitted values, or make various determinations about the communication link based on the comparison. In some examples, the receiving node (e.g., the UE 115-a) may generate and transmit reports to the transmitting node (e.g., the base station 105-a). Examples of reference signals 205 in a downlink channel may include a CSI-RS 210, cell specific reference signal (CRS), multicast broadcast single frequency network (MBSFN) reference signals, UE-specific reference signals (DM-RS), or positioning reference signals, among others. Examples of reference signals 205 in an uplink channel may include a sounding reference signal (SRS) 215, or a demodulation reference signal (DMRS), among other examples.

To perform channel estimation for some downlink channels, a base station 105-a may transmit CSI-RSs (e.g., CSI-RS 210) to the UE 115-a. The UE 115-a may perform the channel estimation and generate a channel state information (CSI) report and transmit the CSI report to the base station 105-a. The base station 105-a may use the CSI report to perform scheduling or other procedures. Techniques are described herein to allocate more than one CSI-RS RE during a TTI (e.g., a subframe) to one port of the UE 115-a. In such examples, the ratio of CSI-RS REs-to-ports of a UE may be greater than one-to-one.

To perform channel estimation for some uplink channels, a UE 115-a may transmit one or more SRSs (e.g., SRS 215) during a TTI (e.g., a subframe). The UE 115-a may be configured to repeat the SRSs during a transmission (e.g., a number of times) based on the accuracy of the channel estimation that is desired. The UE 115-a may determine a number of SRSs to be used to achieve a desired channel estimation accuracy and then transmit those SRSs to the base station 105-a. The base station 105-a may perform the channel estimation based on receiving the one or more SRSs.

Figure 3:
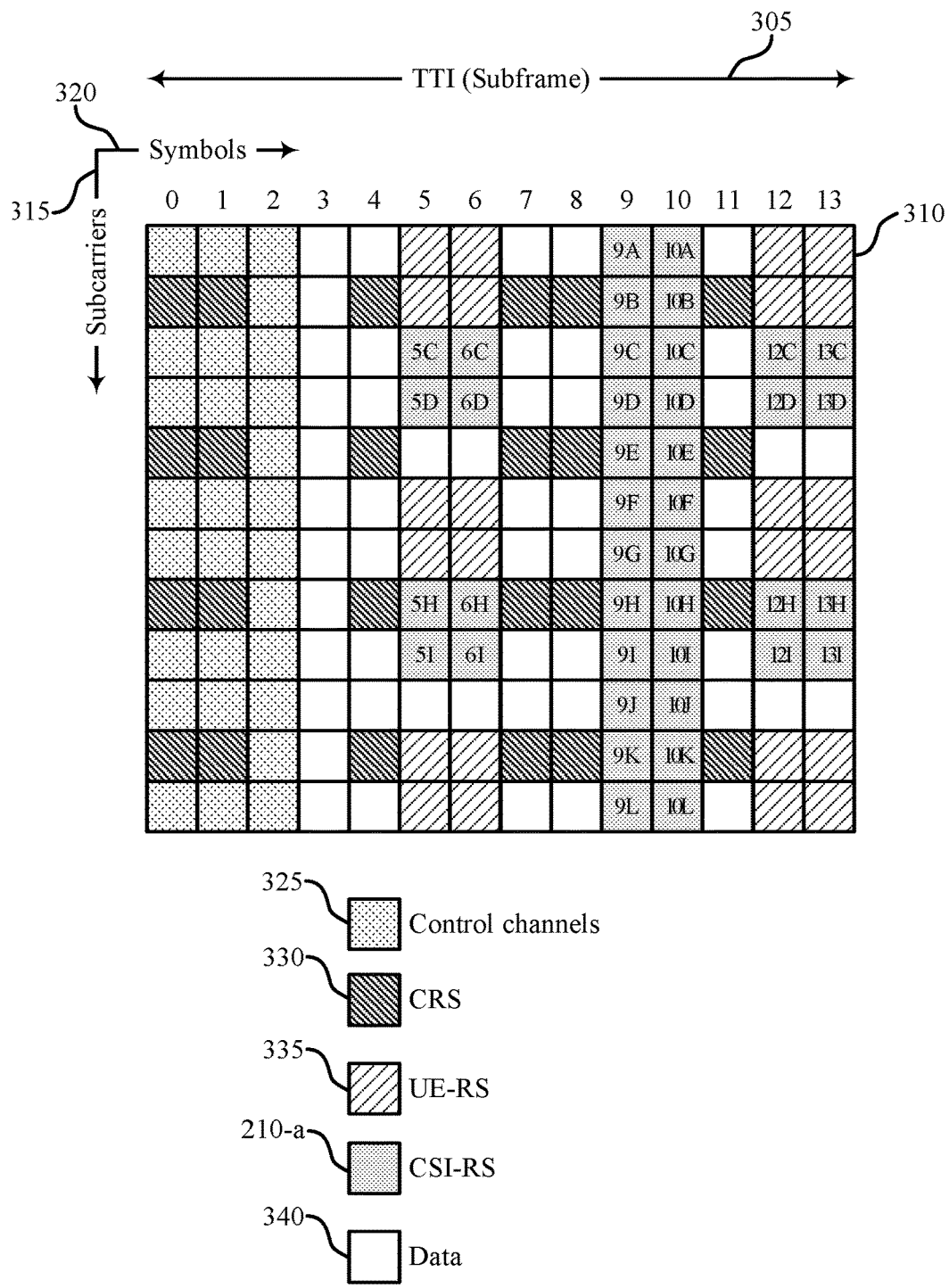
FIG. 3 illustrates an example of a resource structure that supports techniques for channel estimation in accordance with aspects of the present disclosure.

FIG. 3 illustrates an example of a resource structure 300 that supports techniques for channel estimation in accordance with aspects of the present disclosure. In some examples, the resource structure 300 may implement aspects of wireless communications systems 100 or 200. The resource structure 300 illustrates example distributions of different types of signals in a TTI 305 (e.g., a subframe) of a downlink channel. The TTI 305 may include a plurality of REs 310. The REs 310 denote a frequency resource such as a subcarrier 315 and a time resource such as a symbol 320. The different types of signals assigned to REs 310 may include control channel signals 325, CRS signals 330, UE-RS signals 335, CSI-RS signals 210-a, data signals 340, other types of signals, or a combination thereof.

The various types of signals may be distributed based on a distribution (e.g., a preconfigured distribution) in the TTI 305. For example, the CSI-RSs 210-a may be assigned to specific REs 310 based on a preconfigured mapping. For example, at least some REs 310 in symbols 5, 6, 9, 10, 12, and 13 may be mapped to CSI-RSs 210-a. In other examples, the distribution may not be preconfigured, and may be semi-static or dynamic, among other examples. In some examples, the mapping may additionally or alternative be semi-static or dynamic, among other examples.

The base station 105-a may be configured to allocate REs 310 to various communication needs in the wireless communications system. For example, the base station 105-a may be configured to assign various CSI-RS 210-a REs 310 to different UEs or different UE ports. In some examples, these allocations may be based at least in part on various modes, which may in some cases be preconfigured modes. For example, the base station 105-a may operate according to a 2 CSI-RS port mode, a 4 CS-RS port mode, or an 8 CSI-RS port mode.

Techniques are also described herein for allocating CSI-RS 210-a REs 310 to different UEs 115-a or different ports of UEs in a dynamic or semi-static manner. In this manner, the base station 105-a may have flexibility on how CSI-RSs 210-a are allocated to other nodes in the wireless communications system. In some examples, the base station 105-a may allocate CSI-RSs 210-a REs 310 to a port of a UE 115-a on an RE-by-RE basis. For example, the base station 105-a may allocate CSI-RS 5C to a first port of a first UE and CSI-RS 6C to a second port of the first UE or a third port of a second UE. In some examples, an orthogonal cover code (OCC) may be across one or more REs. In such examples, a group of REs may be used by the same UE and the same ports, the same UE and different ports, or for different UEs, while being orthogonal in the code domain. In some examples, the base station 105-a may allocate CSI-RSs 210-a REs 310 to a UE 115-a in RE pairs. For example, CSI-RSs 5C and 6C may be allocated to a single UE 115-a. In some examples, the RE pairs may be allocated to two ports of the UE 115-a such that the ratio of allocated CSI-RS REs-to-ports of a UE is one-to-one. In some examples, REs 310 in an RE pair may share a common subcarrier 315 but be in different symbols 320 (e.g., 5C and 6C). In some examples, REs 310 in an RE pair may share a common symbol 320 but be in different subcarriers 315 (e.g., 5C and 5D). In some examples, REs 310 in an RE pair may be adjacent to one another (e.g., 5C and 6C or 5C and 5D). In some examples, REs 310 in an RE pair may be separate from one another (e.g., 5C and 6D or 5C and 9C or 5C and 5H).

The base station 105-*a* may be configured to allocate CSI-RS 210-*a* RE 310 to be used by UEs 115-*a* or ports of UEs in any conceivable manner. If the base station 105-*a* determines that a port of a UE 115-*a* should have a highly accurate channel estimation to meet its QoS parameters (e.g., requirements), the base station 105-*a* may allocate any number of CSI-RS 210-*a* REs 310 or any number of CSI-RS RE pairs to the port of the UE 115-*a*. For example, the base station 105-*a* may allocate CSI-RSs 5C, 6C, 9F, 10F, 12I, and 13I to a single UE 115-*a*, a single port of a UE 115-*a*, or a pair of ports of a single UE 115-*a*.

The accuracy or the confidence level of a channel estimation performed by a UE 115-*a* may increase as the number of CSI-RSs 210-*a* used for the channel estimation increases. The base station 105-*a* may allocate a number of CSI-RSs 210-*a* to a UE or a port of UE to alter the accuracy of the channel estimation. For example, the base station 105-*a* may allocate more CSI-RSs 210-*a* to a UE 115-*a* for more accurate channel estimations.

For the UE 115-*a* to use the CSI-RSs 210-*a* for channel estimation, the base station 105-*a* may indicate which CSI-RS 210-*a* REs 310 is/are allocated to the UE 115-*a*. Signaling for such an indication is also described herein. In some examples, where the CSI-RSs are allocated over a different symbols, the processing timeline for the UE 115-*a* may be relaxed to allow for all of the REs to arrive before processing is complete. In some examples, the UE 115-*a* may indicate a timeline the UE 115-*a* may be capable of supporting as a function of a gap between pairs of symbols carrying CSI-RS.

Figure 4:
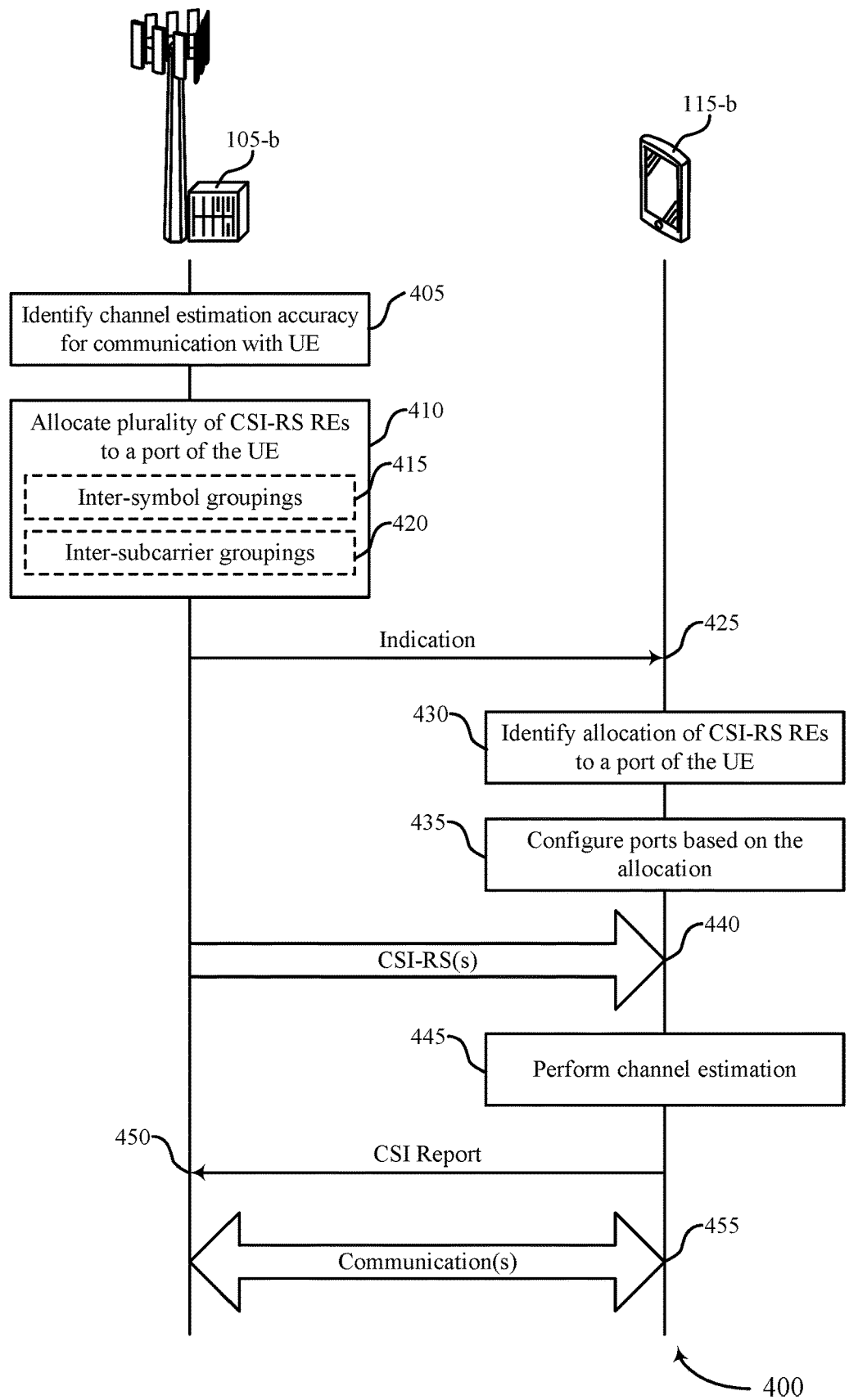
FIG. 4 illustrates an example of a process flow that supports techniques for channel estimation in accordance with aspects of the present disclosure.

FIG. 4 illustrates an example of a process flow 400 that supports techniques for channel estimation in accordance with aspects of the present disclosure. In some examples, the process flow 400 may implement aspects of wireless communications systems 100 or 200. The process flow 400 illustrates procedures and communications of a base station 105-*b* and a UE 115-*b* for improving channel estimation using dynamic or semi-static allocations of CSI-RS REs to the UE 115-*b*.

At block 405, the base station 105-*b* may identify a channel estimation accuracy for communications with the UE 115-*b*. The channel estimation accuracy may be an indication of what level of accuracy of the channel estimation may need to be considered sufficient or successful. For example, the communications may be sensitive to changes in channel conditions such that inaccuracies in channel estimation may cause a radio link failure event or cause the information to not reach its intended destination. In some examples, the base station 105-*b* may identify a channel estimation accuracy based on channel condition of the communication link between the base station 105-*b* and the UE 115-*b*. For example, if the quality of the channel is degrading or has degraded, the base station 105-*a* may determine that more accurate channel estimations may be needed for certain types of communications. In some examples, the base station 105-*b* may determine a type of data being communicated (e.g., URLLC data) or a QoS parameter (e.g., requirement) related to the data being communicated and base the channel estimation accuracy on at least one of the type of data or the QoS parameter.

At block 410, the base station 105-*b* may allocate a plurality of CSI-RS REs to a port of the UE 115-*b* based on identifying the channel estimation accuracy. If the base station 105-*b* determines that additional accuracy is needed, the base station 105-*b* may allocate more than one CSI-RS RE or more than one CSI-RS RE pair to a port of the UE 115-*b*. In this manner, the UE 115-*b* may now be configured to use additional CSI-RSs to perform channel estimation at the port and thereby measure more accurate channel parameters or CSI.

In some examples, the base station 105-*b* may allocate CSI-RS REs in inter-symbol groupings 415. An inter-symbol grouping 415 may be an example where CSI-RS REs allocated to a single port are in different symbols of the TTI. The allocations of inter-symbol groupings 415 may be performed on an RE pair-by-RE pair basis, as one example. Examples of inter-symbol groupings 415 may include CSI-RSs 5C, 6C, 9C, 10C, 12C, 13C, or any combination thereof being allocated to a single port of the UE 115-*b* or a single port pair of the UE 115-*b*.

In some examples, the base station 105-*b* may allocate CSI-RS REs in inter-subcarrier groupings 420. The allocations of inter-subcarrier groupings 420 may be done on an RE pair-by-RE pair basis, as one example. Examples of inter-subcarrier groupings 420 may include CSI-RSs 9A, 9B, 9C, 9D, 9E, 9F, 9G, 9H, 9I, 9J, 9K, 9L, or any combination thereof being allocated to a single port of the UE 115-*b* or a single port pair of the UE 115-*b*.

In some examples, the base station 105-*b* may allocate CSI-RS REs in inter-symbol groupings 415, inter-subcarrier groupings 420, or a combination thereof. For example, the base station 105-*b* may allocate CSI-RS REs to ports of the UE 115-*b* in any conceivable fashion.

Typically, CSI-RSs may be allocated in RE pairs to a pair of ports of the UE 115-*b*. In such configurations, the ratio CSI-RS RE-to-port of a UE may be fixed at one-to-one even though the allocations are made in pairs. In some examples, the base station 105-*b* may allocate CSI-RS REs such that the ratio is N-to-1, where N is greater than one. Such allocations may be made when the base station 105-*b* allocates CSI-RS REs in RE pairs, whether to port pairs or to singular ports. In some examples, to adjacent REs may be allocated to the same port (e.g., 5C and 6C may be allocated to a single port of the UE 115-*b*).

The base station 105-*b* may transmit an indication 425 of the allocation of CSI-RS REs to the various ports of the UE 115-*b*. The indication 425 may be included in any type of message or signal. In some examples, the indication 425 may be transmitted across a control channel (e.g., PDCCH) or a data channel (e.g., PDSCH). In some examples, the indication 425 is included in a radio resource control (RRC) message. In some examples, the indication 425 is included in control information such as downlink control information (DCI).

At block 430, the UE 115-*b* may identify the allocation of CSI-RS REs to one or more ports of the UE 115-*b* based on receiving the indication 425. In some examples, the indication 425 may include data identifying each individual allocation of the CSI-RS REs. In some examples, the indication 425 may include an index of a preconfigured allocation of CSI-RS REs. In such examples, the index may refer to a preconfigured allocation of CSI-RS REs.

At block 435, the UE 115-*b* may configure one or more ports based on the allocation of the CSI-RS REs. The UE 115-*b* may be ready to receive CSI-RSs and perform channel estimation using those CSI-RSs. The base station 105-*b* may transmit one or more CSI-RSs 440 during the TTI.

At block 445, the UE 115-*b* may perform channel estimation based on receiving the CSI-RSs 440 in the TTI and the allocation of CSI-RS REs to the various ports of the UE 115-*b*. During channel estimation, the UE 115-*b* may measure one or more characteristics of the CSI-RSs 440. The UE 115-*b* may compare the measured characteristics to one or more expected values or one or more transmission values. The UE 115-*b* may determine CSI or other information based on the comparison. The UE 115-*b* may transmit a CSI report 450 to the base station 105-*b* that includes the measurements made by the UE 115-*b* or the information determined based on the measurements.

The base station 105-*b* or the UE 115-*b* may configure one or more communications 455 using the CSI report 450. The base station 105-*b* may use the CSI report to schedule communication resources (e.g., downlink resources) or configure other aspects of a communication link.

Figure 5:
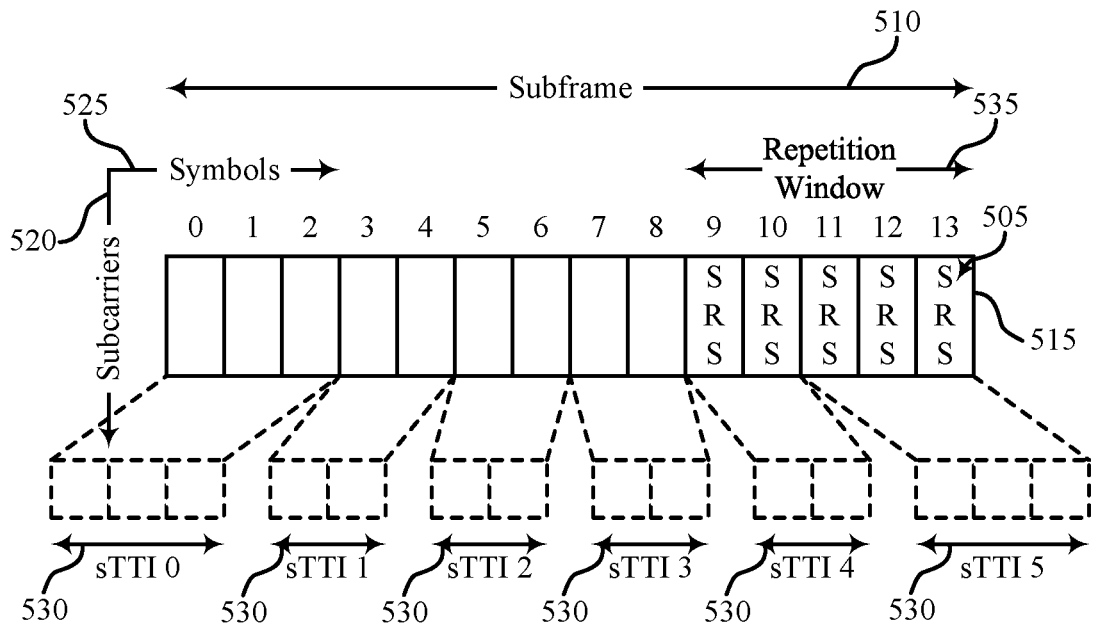
FIG. 5 illustrates an example of a resource structure that supports techniques for channel estimation in accordance with aspects of the present disclosure.

FIG. 5 illustrates an example of a resource structure 500 that supports techniques for channel estimation in accordance with aspects of the present disclosure. In some examples, the resource structure 500 may implement aspects of wireless communications systems 100 or 200. The resource structure 500 illustrates possible locations for SRSs 505 in a TTI 510 (e.g., a subframe) of a downlink channel. The TTI 510 includes a plurality of REs 515. The REs 515 denote a frequency resource such as a subcarrier 520 and a time resource such as a symbol 525. The illustrative set of REs 515 only show REs for a single subcarrier 520. In some examples, the TTI 510 may include REs in different subcarriers 520, as another example.

A UE 115-*b* may transmit an SRS 505 at the end of a TTI 510 to enable the base station 105-*b* to perform channel estimation and determine conditions of the uplink channel. Techniques are described herein where the UE 115-*b* may be configured to transmit a plurality of SRSs 505 during a TTI 510. By increasing the number of SRSs 505, the accuracy of the channel estimation performed by the base station 105-*b* may be increased.

As part of transmitting uplink data, the UE 115-*b* may identify locations that may include SRSs. The UE 115-*b* may also identify a channel estimation accuracy or a channel estimation accuracy parameter. The UE 115-*b* may select a number of SRSs to include in a TTI 510 based on the desired channel estimation accuracy or locations that could include the SRSs 505.

Once the number of SRSs 505 is determined, the UE 115-*b* may assign those SRSs to a number of REs 515 (e.g., symbols or subcarrier resources) in the TTI 510. The SRSs 505 may be assigned to any REs 515 in the TTI 510. In some examples, SRSs 505 may be assigned to symbols (e.g., at the end of the TTI 510). In some examples, the SRS repetitions in a TTI 510 may be an example of a block repetition. In some block repetitions, the SRSs 505 are transmitted using symbols in the same frequency band. In some examples, the block repetition may span different TTIs or different subframes.

In some examples, the number of SRS repetitions in a TTI 510 and their assignment to REs may be done on a symbol-by-symbol basis or an RE-by-RE basis, meaning that, in some examples, the RE may be the smallest assignable unit for an SRS.

In some examples, the number of SRS repetitions in a TTI 510 and their assignment to REs may be done on a short TTI (sTTI)-by-sTTI basis. A wireless communications system may support TTIs of different lengths to service different QoS parameters for different traffic types. An sTTI 530 is a TTI that has a short length than a standard TTI 510 and, in some cases, the sTTI 530 may be associated with URLLC traffic. In some examples, sTTIs 530 may be mapped to a standard TTI using a mapping (e.g., a preconfigured mapping) that allows traffic that uses sTTIs 530 to cooperate with traffic that uses TTIs 510. An example of a preconfigured mapping of sTTIs 530 to a TTI 510 may be {3, 2, 2, 2, 2, 3}, meaning the first sTTI 530 in a TTI 510 may be three symbols long, a second sTTI 530 may be two symbols long, etc. If SRSs 505 are assigned on an sTTI-by-sTTI basis then not all number of SRSs 505 may be possible. If SRSs 505 are assigned from the back of the TTI 510, the minimum number of SRSs may be three REs based on the last sTTI 530 being three symbols long. Other possible numbers of SRS transmissions when using the sTTI procedure may include three SRS transmissions (3 REs), five SRS transmissions (3+2 REs), seven SRS transmission (3+2+2 REs), etc.

In some examples, the SRS repetition pattern may hop between two different TTIs. The UE 115-*b* may generate a repetition window 535 for the SRSs 505. The repetition window 535 may define a length K, where K is the number of REs assigned to SRSs 505. In some examples, the entire repetition window 535 may be positioned within the same TTI 510. In some examples, the repetition window 535 may span multiple (e.g., two) TTIs 510. In such a case, some of the SRSs 505 in the repetition window 535 may be transmitted during a first TTI 510 and some of the SRSs 505 in the repetition window 535 may be transmitted during a second TTI 510. The SRSs 505 may be transmitted sequential in adjacent REs 515 to improve the channel estimation performed by the base station 105-*b*. Signaling and other procedures related to transmitting a plurality of SRSs 505 is described herein.

Figure 6:
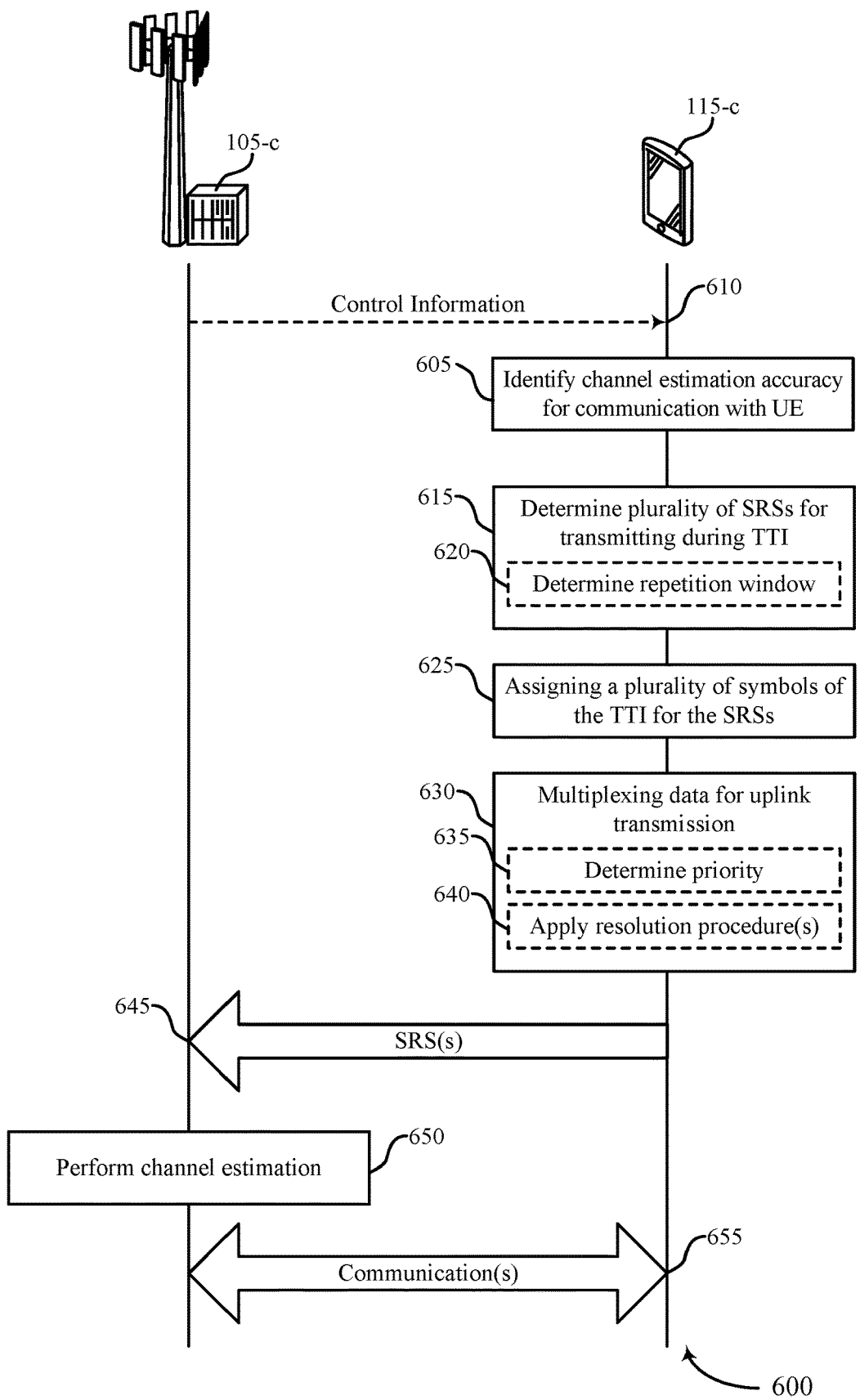
FIG. 6 illustrates an example of a process flow that supports techniques for channel estimation in accordance with aspects of the present disclosure.

FIG. 6 illustrates an example of a process flow 600 that supports techniques for channel estimation in accordance with aspects of the present disclosure. In some examples, the process flow 600 may implement aspects of wireless communications systems 100 or 200. The process flow 600 illustrates procedures and communications of a base station 105-*c* and a UE 115-*c* for improving channel estimation using dynamic or semi-static assignments of SRSs to REs of a TTI (e.g., subframe).

At block 605, the UE 115-*c* may identify a channel estimation accuracy for communications with the base station 105-*c*. The channel estimation accuracy may be an indication of what level of accuracy of the channel estimation may need. For example, the communications may be sensitive to changes in channel conditions such that inaccuracies in channel estimation may cause a radio link failure event or cause the information to not reach its intended destination. In some examples, the UE 115-*c* may identify a channel estimation accuracy based on channel condition of the communication link between the base station 105-*c* and the UE 115-*c*. For example, if the quality of the channel is degrading or has degraded, the UE 115-*c* may determine that more accurate channel estimations may be need for certain types of communications. In some examples, the UE 115-*c* may determine a type of data being communicated (e.g., URLLC data) or a QoS parameters of the data being communicated and base the channel estimation accuracy on at least one of the type of data or the QoS parameter.

In some examples, the UE 115-*c* may identify the channel estimation accuracy based on signaling from the base station 105-*c*. For example, the base station 105-*c* may transmit control information 610 that may include an indication of what level of accuracy is desired for uplink channel estimation. The control information 610 may be communicated using RRC signaling, DCI, or sDCI, among other examples.

At block 615, the UE 115-*c* may determine a plurality of SRSs for transmitting during the TTI. Alternatively or additionally, the UE 115-*c* may determine a number of SRSs that are to be transmitted sequentially, one right after another. By transmitting a group of SRSs sequentially, the base station 105-c can use all of the SRSs in the group and obtain a more accurate channel estimation.

The UE 115-c may determine a repetition window 620 for the group of SRSs. The repetition window 620 may define a length K, where K indicates the number of SRSs that should be transmitted sequentially. In some examples, the number of SRSs in the repetition window 620 may be determined on an RE-by-RE basis, meaning any RE of the TTI could be assigned an SRS and the granularity of assigning SRSs to REs may be one RE. In some examples, the number of SRSs in the repetition window 620 may be determined on an sTTI-by-sTTI basis, meaning the granularity of assigning SRSs to REs may be one sTTI, which may include more than one RE.

In some cases, the SRSs in a repetition window 620 may be transmitted on the same subcarrier but in a sequential group of symbols, among other examples. In such cases, the SRSs may be used to determine channel conditions on that subcarrier. In some examples, SRSs in a repetition window 620 may transmitted on different subcarriers but using the same symbol. In some examples, SRSs in a repetition window 620 may be transmitted on different subcarriers and on different symbols. In some examples, the SRSs in a repetition window 620 may be transmitted in a single TTI (e.g., subframe). In some examples, the SRSs in a repetition window 620 may be transmitted in two or more TTIs.

At block 625, the UE 115-c may assign a plurality of symbols (or a plurality of REs) of the TTI for SRSs. The UE 115-c may assign REs by positioning the repetition window 620 (or the group of SRSs) at the end of the TTI. In such a configuration, the last SRS in a repetition window may be assigned to the last symbol in a TTI. In some examples, SRSs can hop between TTIs. In such examples, a first portion of SRSs in the repetition window 620 may be positioned in a first TTI and a second portion of SRSs in the repetition window 620 may be positioned in a second TTI. In such configurations, the SRSs may still be transmitted in sequential symbols of a subcarrier or in sequential REs, while the REs may be in different TTIs or subframes.

At block 630, the UE 115-c may multiplex different data for uplink transmissions. When multiplexing data for transmission, the UE 115-c may have to prioritize some data over other data. For example, an sTTI may be allocated for URLLC information but the standard TTI may be allocated for a different type of data. When transmitting, the UE 115-c may determine the priority of data (at block 635) and may apply resolution procedure(s) (at block 640).

At block 635, the UE 115-c may determine a priority of the different data being transmitted. In some examples, the SRS transmission may be a low priority transmission and thus may be dropped or downgraded in power. In applications where accurate channel estimations are critical to maintaining performance of a communication link, the SRSs may be as higher priority.

The UE 115-c may determine whether the SRSs are colliding with a channel having a longer length (e.g., SRSs on scheduled on sTTIs and the other data is scheduled on a standard TTI). When the channel conflicting with the SRSs is longer, the UE 115-c may determine whether transmissions are on the same cell or different cells. If transmissions with different lengths are over difference component carriers are supported by the UE 115-c, all of the channels may be sent. If, however, the transmissions are on the same cell using the same component carrier, the UE 115-c may apply one or more resolution procedures at block 640. A first resolution procedure may indicate that the SRS takes precedence and the data in the longer channel may be dropped from the transmission. A second resolution procedure may indicate that priority between the two channels may be based on the content of the longer channel. For example, if the longer channel includes a DMRS or a hybrid automatic repeat request (HARQ) acknowledgement (ACK) or a negative acknowledgement (NACK), the longer channel may get precedence and the SRSs may be dropped. If, however, the longer channel does not include that content, the SRSs may take precedence and the content of the longer channel may be dropped.

When the channel conflicting with the SRSs has the same length as the channel with the SRSs, the UE 115-c may use power scaling rules as a resolution procedure at block 640. In some examples, the power of transmission of the SRSs and the other channel may be scaled based on their content. For example, the SRSs may have a higher priority over non-URLLC communications or SPUSCH. In other examples, the priority may be based on whether the other channel includes HARQ-ACK, HARQ-NACK, or DMRS. In such examples, if the other channel has HARQ-ACK, HARQ-NACK, or DMRS, the other channel may get precedence over the SRSs in the power scaling rules.

The UE 115-c may transmit one or more SRSs 645 during the TTI or during a plurality of TTIs in the hopping example. At block 650, the base station 105-c may perform channel estimation based on receiving the SRSs 645 in the TTI. During channel estimation, the base station 105-c may measure one or more characteristics of the SRSs 645. The base station 105-c may compare the measured characteristics to one or more expected values or one or more transmission values. The base station 105-c may determine CSI or other information based on the comparison. The base station 105-c or the UE 115-c may exchange one or more communications 655. The base station 105-c may use the channel estimations to schedule communication resources (e.g., downlink resources) or configure other aspects of a communication link.

In some examples, the ability to allocate REs to CSI-RSs or transmit multiple SRSs may be applied to physical downlink shared channel (PDSCH) or physical uplink shared channel (PUSCH) transmissions. For example, for URLLC data, a repetition-based transmission scheme may be supported where the same transport block may be transmitted multiple times. In some examples, the transport block may be transmitted multiple times without HARQ-ACK feedback. The resources for the transport block and the repeating transmissions of the transport block may be accomplished using the principles for CSI-RS transmissions described with references to FIGS. 2-4 or the principles for SRS transmission described with reference to FIGS. 5-6. In some examples, the ability to allocate REs to CSI-RSs or transmit multiple SRSs for PDSCH or PUSCH transmissions may occur when PDSCH/PUSCH repetition is configured for the UE.

Figure 7:
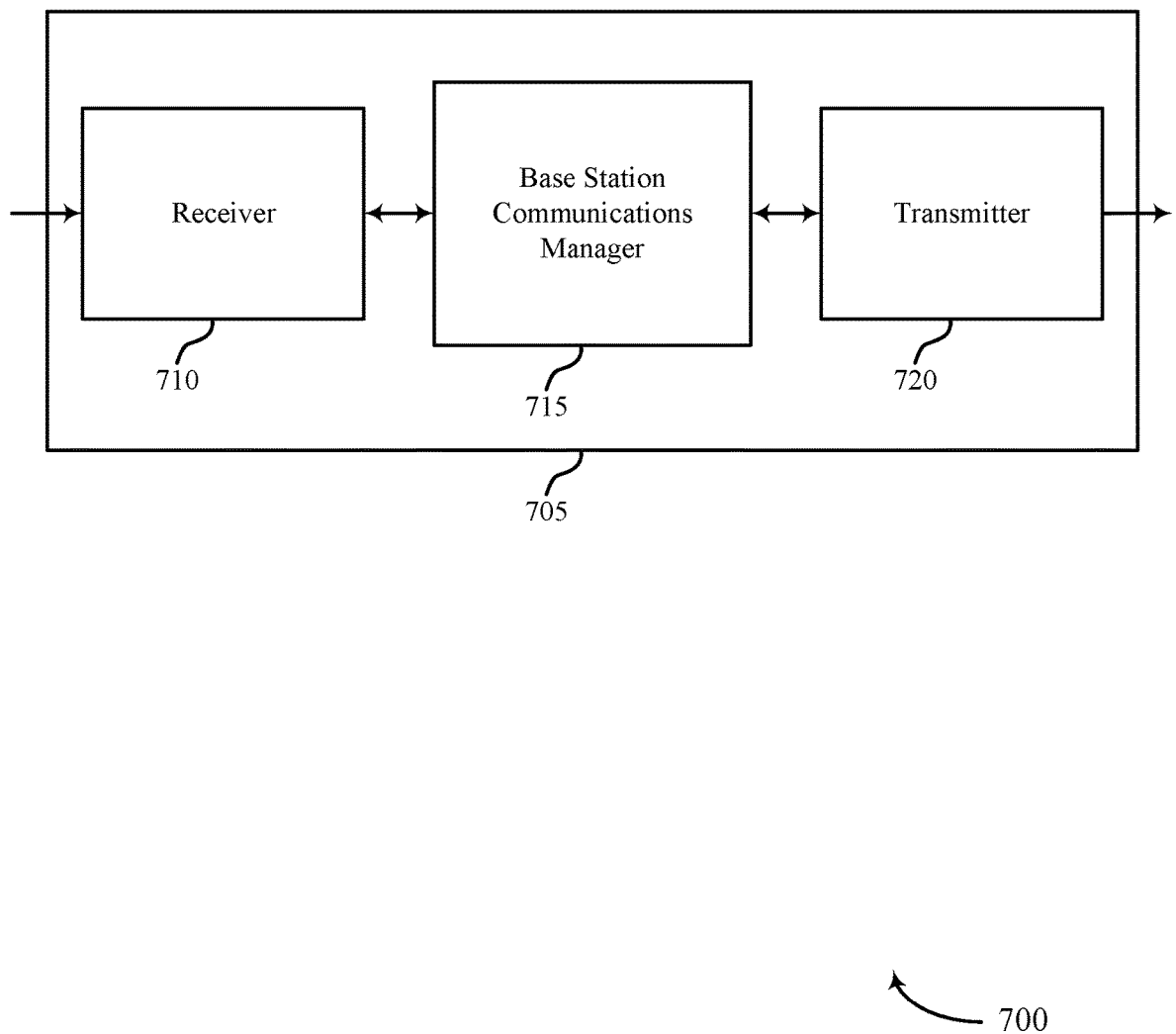
FIGS. 7 through 9 show block diagrams of a device that supports techniques for channel estimation in accordance with aspects of the present disclosure.

FIG. 7 shows a block diagram 700 of a wireless device 705 that supports techniques for channel estimation in accordance with aspects of the present disclosure. Wireless device 705 may be an example of aspects of a base station 105 as described herein. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to techniques for channel estimation, etc.). Information may be passed on to other components of the device. The receiver 710 may be an example of aspects of the transceiver 1035 described with reference to FIG. 10. The receiver 710 may utilize a single antenna or a set of antennas. Receiver 710 may receive, by a base station, a set of SRSs from a UE during a TTI.

Base station communications manager 715 may be an example of aspects of the base station communications manager 1015 described with reference to FIG. 10. Base station communications manager 715 or at least some of its various sub-components may be implemented in hardware, software executed by a processor, firmware, or any combination thereof. If implemented in software executed by a processor, the functions of the base station communications manager 715 or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 715 or at least some of its various sub-components may be physically located at various positions, including being distributed such that portions of functions are implemented at different physical locations by one or more physical devices. In some examples, base station communications manager 715 or at least some of its various sub-components may be a separate and distinct component in accordance with various aspects of the present disclosure. In other examples, base station communications manager 715 or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 715 may allocate a set of CSI-RS REs of a TTI to a port of a UE. The base station communications manager 715 may also perform a channel estimation using the set of SRSs received from the UE and allocate resources to the UE based on performing the channel estimation.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Transmitter 720 may transmit, to the UE, an indication of the set of CSI-RS REs allocated to the port of the UE and transmit at least one CSI-RS to the UE during the TTI. In some examples, the indication is included in a radio resource control (RRC) message.

Figure 8:
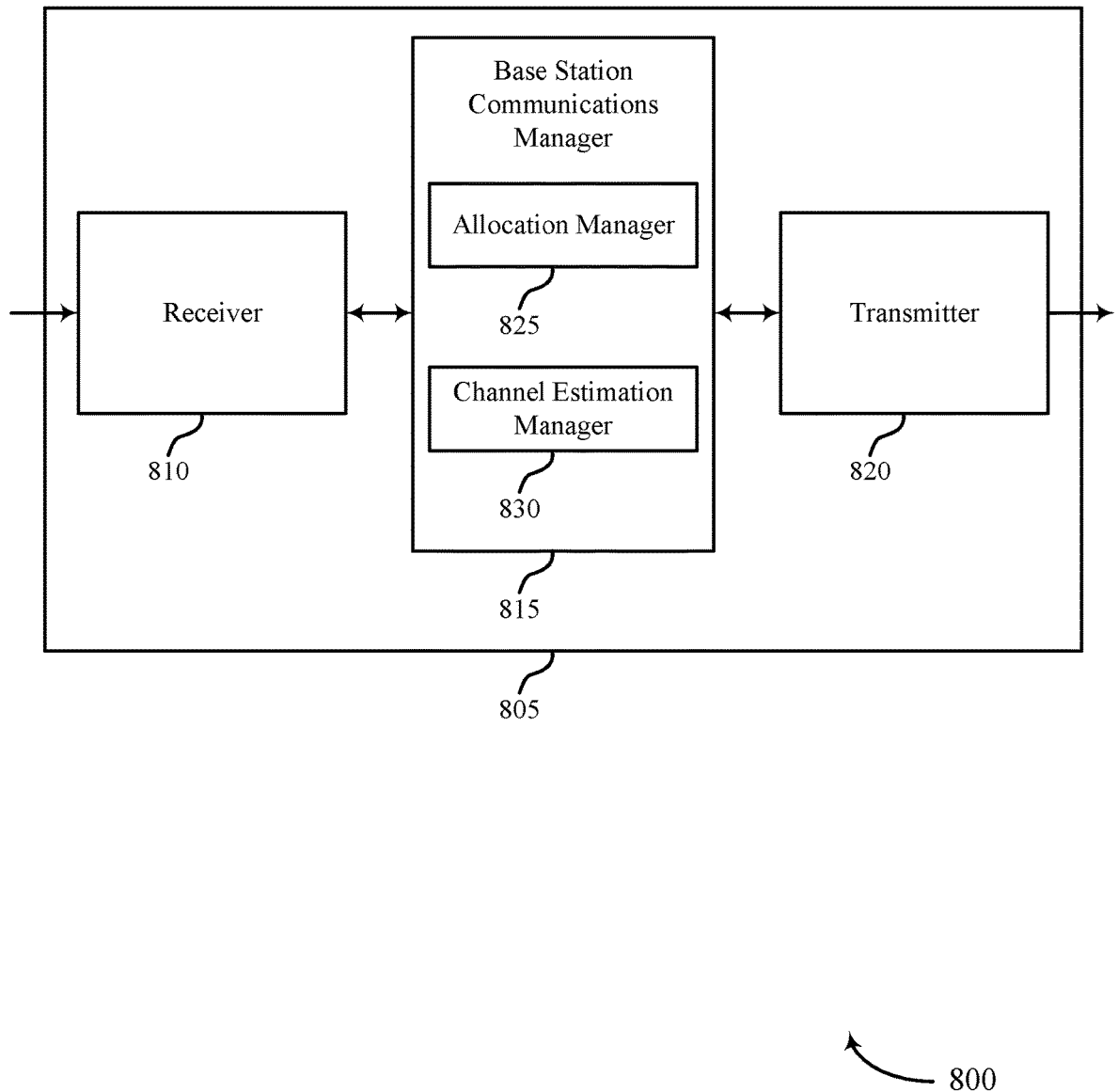

FIG. 8 shows a block diagram 800 of a wireless device 805 that supports techniques for channel estimation in accordance with aspects of the present disclosure. Wireless device 805 may be an example of aspects of a wireless device 705 or a base station 105 as described with reference to FIG. 7. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to techniques for channel estimation, etc.). Information may be passed on to other components of the device. The receiver 810 may be an example of aspects of the transceiver 1035 described with reference to FIG. 10. The receiver 810 may utilize a single antenna or a set of antennas.

Base station communications manager 815 may be an example of aspects of the base station communications manager 1015 described with reference to FIG. 10. Base station communications manager 815 may also include allocation manager 825 and channel estimation manager 830.

Allocation manager 825 may allocate a set of CSI-RS REs of a TTI to a port of a UE and allocate resources to the UE based on performing the channel estimation. In some examples, allocating the CSI-RS REs to the UE may include allocating the CSI-RS REs in the TTI such that a ratio of the CSI-RS REs and a number of ports of the UE is greater than one-to-one. In some examples, allocating the CSI-RS REs to the UE may include allocating at least two CSI-RS REs of the set of CSI-RS REs to the port of the UE in different symbols of the TTI. In some examples, allocating the CSI-RS REs to the UE may include allocating at least two CSI-RS REs of the set of CSI-RS REs to the port of the UE in different radio frequency spectrum bands of the TTI within the same resource block. In some examples, allocating the CSI-RS REs to the UE may include allocating at least two CSI-RS REs of the set of CSI-RS REs to the port of the UE in different symbols of the TTI. In some examples, the set of symbols of the TTI are assigned on an sTTI-by-sTTI basis.

Channel estimation manager 830 may identify a channel estimation accuracy for a communication with the UE, where allocating the set of CSI-RS REs to the port of the UE is based on identifying the channel estimation accuracy and perform a channel estimation using the set of SRSs received from the UE.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
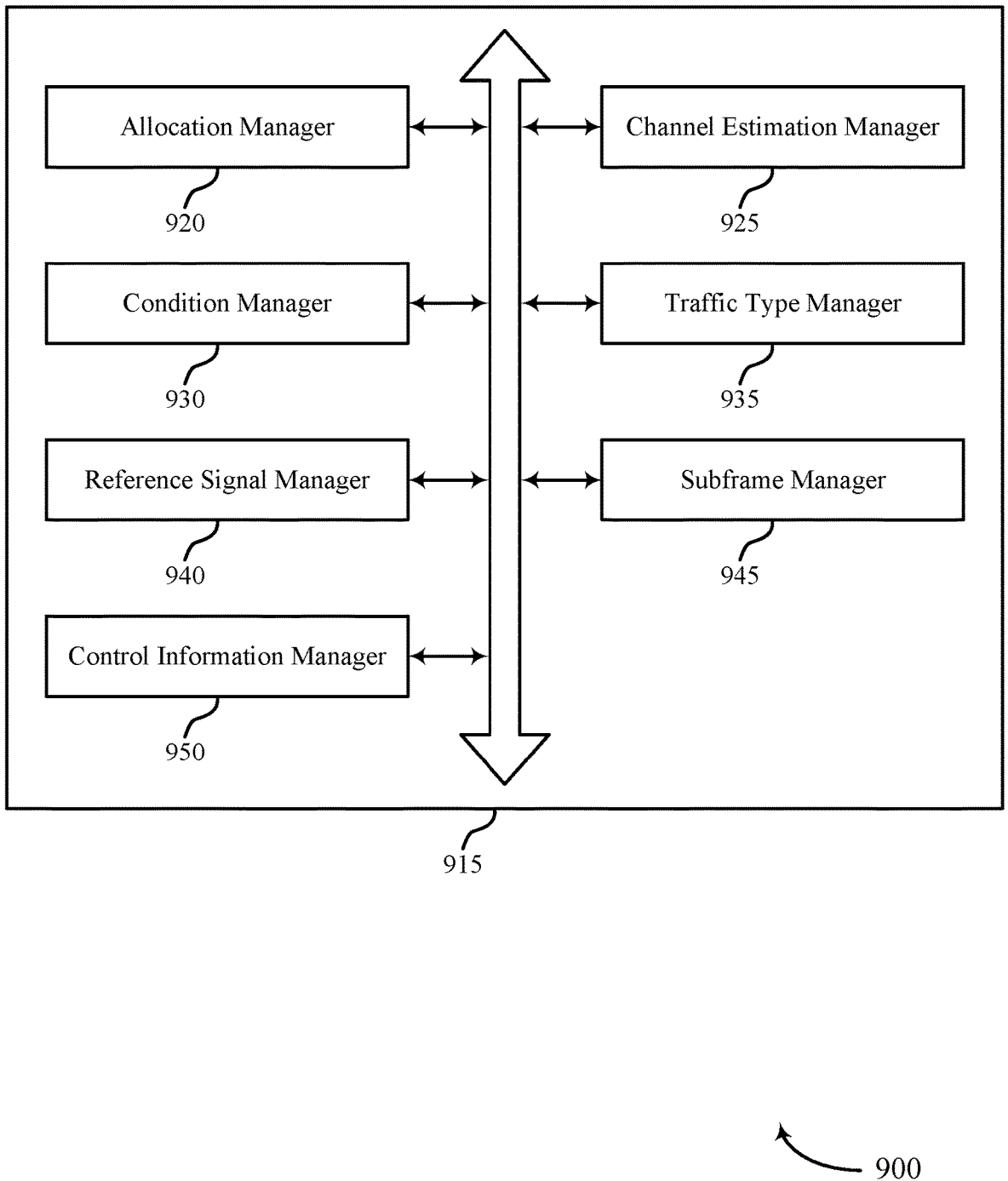

FIG. 9 shows a block diagram 900 of a base station communications manager 915 that supports techniques for channel estimation in accordance with aspects of the present disclosure. The base station communications manager 915 may be an example of aspects of a base station communications manager 715, a base station communications manager 815, or a base station communications manager 1015 described with reference to FIGS. 7, 8, and 10. The base station communications manager 915 may include allocation manager 920, channel estimation manager 925, condition manager 930, traffic type manager 935, reference signal manager 940, subframe manager 945, and control information manager 950. Each of these modules may communicate, directly or indirectly, with one another (e.g., via one or more buses).

Allocation manager 920 may allocate a set of CSI-RS REs of a TTI to a port of a UE and allocate resources to the UE based on performing the channel estimation. In some examples, allocating the CSI-RS REs to the UE may include allocating the CSI-RS REs in the TTI such that a ratio of the CSI-RS REs and a number of ports of the UE is greater than one-to-one. In some examples, allocating the CSI-RS REs to the UE may include allocating at least two CSI-RS REs of the set of CSI-RS REs to the port of the UE in different symbols of the TTI. In some examples, allocating the CSI-RS REs to the UE may include allocating at least two CSI-RS REs of the set of CSI-RS REs to the port of the UE in different radio frequency spectrum bands of the TTI within the same resource block. In some examples, allocating the CSI-RS REs to the UE may include allocating at least two CSI-RS REs of the set of CSI-RS REs to the port of the UE in different symbols of the TTI. In some examples, the set of symbols of the TTI are assigned on an sTTI-by-sTTI basis.

Channel estimation manager 925 may identify a channel estimation accuracy for a communication with the UE, where allocating the set of CSI-RS REs to the port of the UE is based on identifying the channel estimation accuracy and perform a channel estimation using the set of SRSs received from the UE.

Condition manager 930 may identify a channel condition of a communication link with the UE, where allocating the set of CSI-RS REs to the port of the UE is based on identifying the channel condition.

Traffic type manager 935 may identify that the UE is configured with URLLC information, where allocating the set of CSI-RS REs to the port of the UE is based on identifying that the UE is configured with URLLC information.

Reference signal manager 940 may determine the CSI-RS REs in the TTI based on a preconfigured mapping, where allocating the CSI-RS REs to the UE is based on determining the CSI-RS REs in the TTI.

Subframe manager 945 may receive a first set of SRSs of the set of SRSs in a first subframe and a second set of SRSs of the set of SRSs in a second subframe, where performing the channel estimation is based on the first set of SRSs in the first subframe and the second set of SRSs in the second subframe.

Control information manager 950 may transmit downlink control information to the UE, where determining the set of SRSs for transmitting is based on receiving the downlink control information. In some examples, the downlink control information includes short downlink control information.

Figure 10:
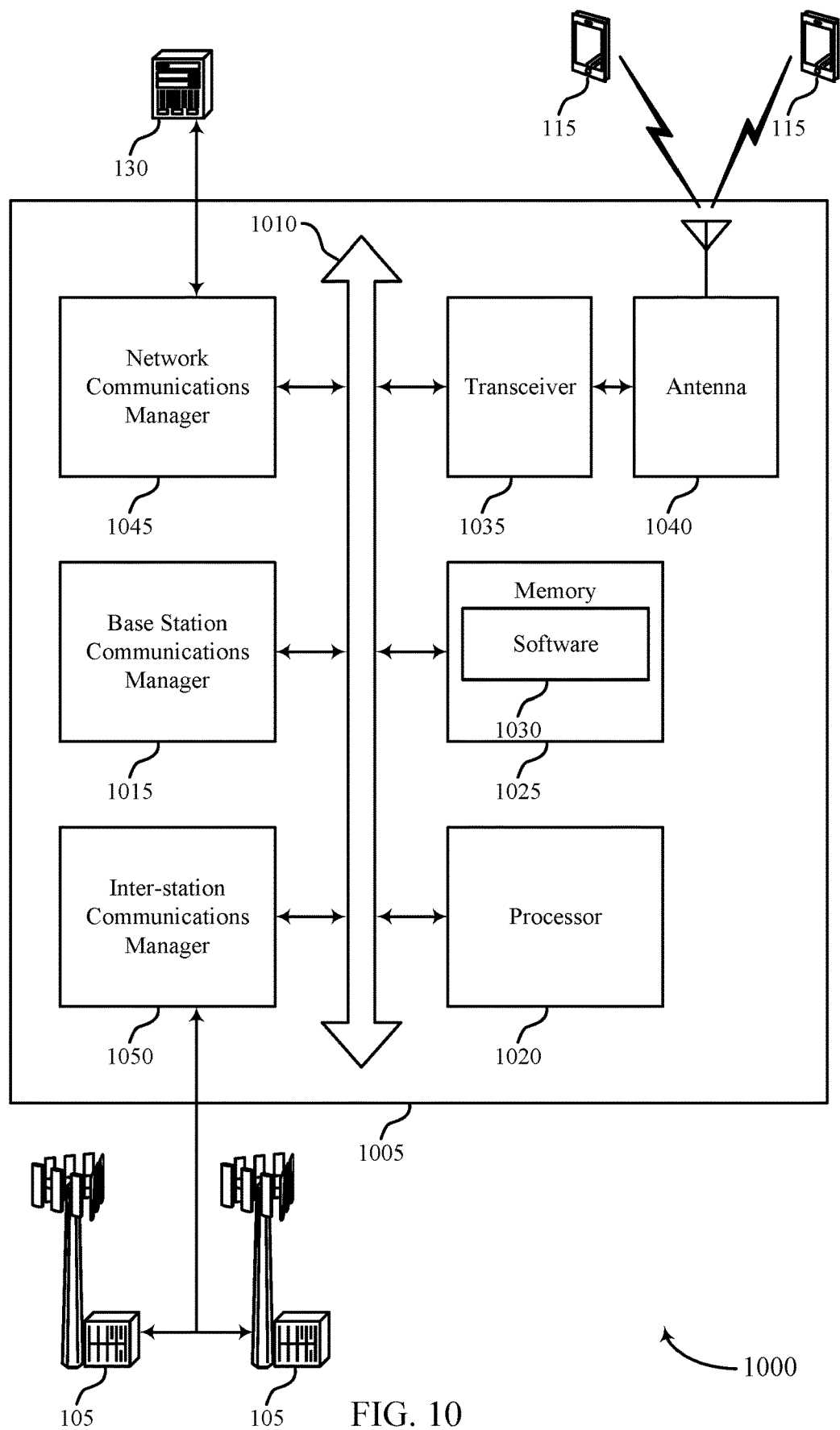
FIG. 10 illustrates a block diagram of a system including a base station that supports techniques for channel estimation in accordance with aspects of the present disclosure.

FIG. 10 shows a diagram of a system 1000 including a device 1005 that supports techniques for channel estimation in accordance with aspects of the present disclosure. Device 1005 may be an example of or include the components of wireless device 705, wireless device 805, or a base station 105 as described above, e.g., with reference to FIGS. 7 and 8. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some examples, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting techniques for channel estimation).

Memory 1025 may include random access memory (RAM) and read only memory (ROM). The memory 1025 may store computer-readable, computer-executable software 1030 including instructions that, when executed, cause the processor to perform various functions described herein. In some examples, the memory 1025 may contain, among other things, a basic input/output system (BIOS) which may control basic hardware or software operation such as the interaction with peripheral components or devices.

Software 1030 may include code to implement aspects of the present disclosure, including code to support techniques for channel estimation. Software 1030 may be stored in a non-transitory computer-readable medium such as system memory or other memory. In some examples, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some examples, the wireless device may include a single antenna 1040. However, in some examples the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within a Long Term Evolution (LTE)/LTE-A wireless communications network technology to provide communication between base stations 105.

Figure 11:
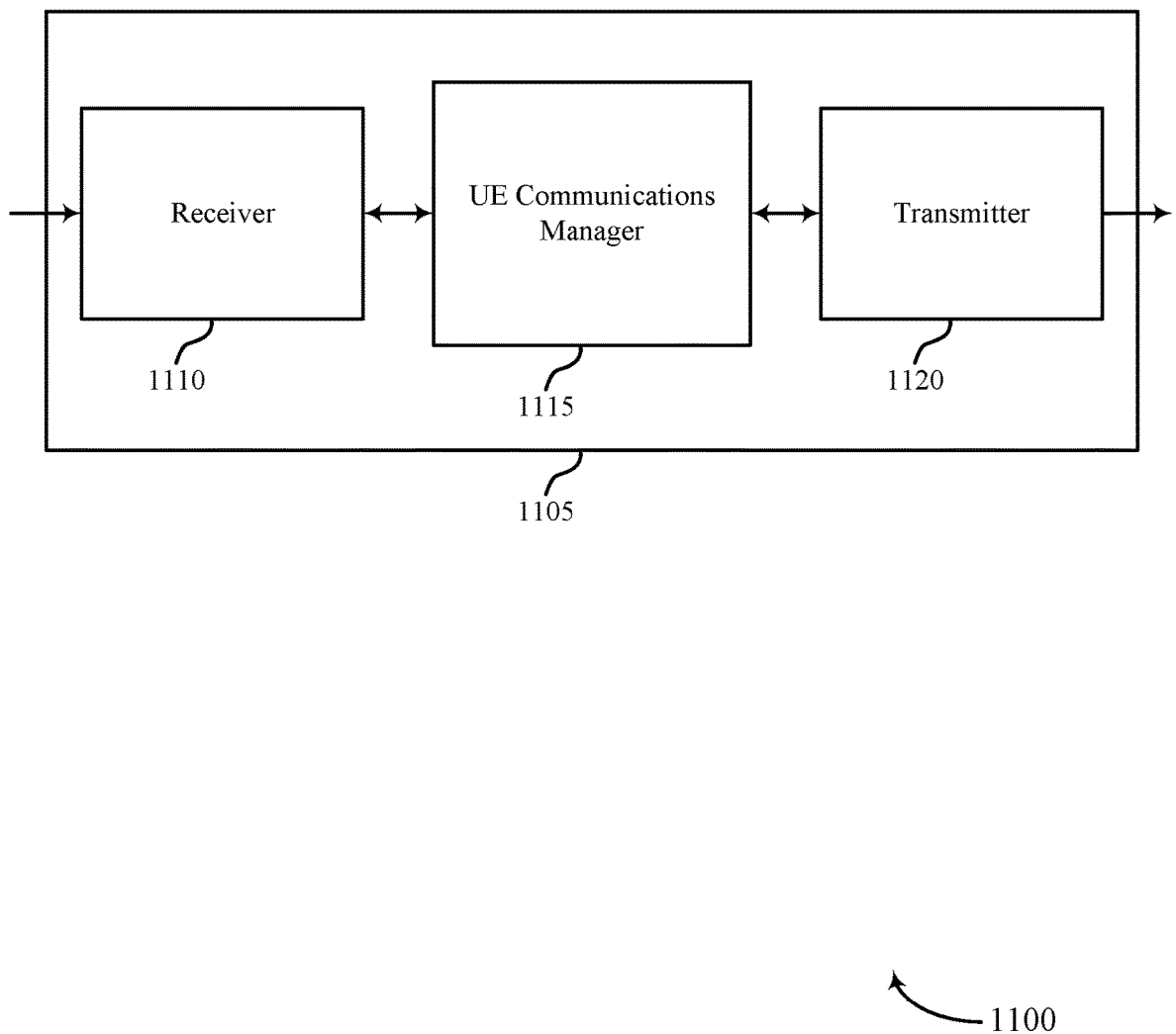
FIGS. 11 through 13 show block diagrams of a device that supports techniques for channel estimation in accordance with aspects of the present disclosure.

FIG. 11 shows a block diagram 1100 of a wireless device 1105 that supports techniques for channel estimation in accordance with aspects of the present disclosure. Wireless device 1105 may be an example of aspects of a UE 115 as described herein. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to techniques for channel estimation, etc.). Information may be passed on to other components of the device. The receiver 1110 may be an example of aspects of the transceiver 1435 described with reference to FIG. 14. The receiver 1110 may utilize a single antenna or a set of antennas.

Receiver 1110 may receive at least one CSI-RS from the base station during the TTI, where performing the channel estimation is based on receiving the at least one CSI-RS and receive downlink control information from a base station, where determining to transmit the set of SRSs is based on receiving the downlink control information. In some examples, the downlink control information includes short downlink control information associated with URLLC.

UE communications manager 1115 may be an example of aspects of the UE communications manager 1415 described with reference to FIG. 14. UE communications manager 1115 or at least some of its various sub-components may be implemented in hardware, software executed by a processor, firmware, or any combination thereof. If implemented in software executed by a processor, the functions of the UE communications manager 1115 or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1115 or at least some of its various sub-components may be physically located at various positions, including being distributed such that portions of functions are implemented at different physical locations by one or more physical devices. In some examples, UE communications manager 1115 or at least some of its various sub-components may be a separate and distinct component in accordance with various aspects of the present disclosure. In other examples, UE communications manager 1115 or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1115 may identify, by a UE, an allocation of a set of CSI-RS REs of a TTI to a port of the UE and perform a channel estimation using the set of CSI-RS REs allocated to the port of the UE based on identifying the allocation of the set CSI-RS REs to the port of the UE. The UE communications manager 1115 may also determine a set of SRSs for transmitting during a TTI and assign a set of symbols of the TTI for transmitting the set of SRSs based on determining the set of SRSs.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Transmitter 1120 may transmit a CSI report to a base station based on performing the channel estimation and transmit the set of SRSs in the TTI based on assigning the set of symbols.

Figure 12:
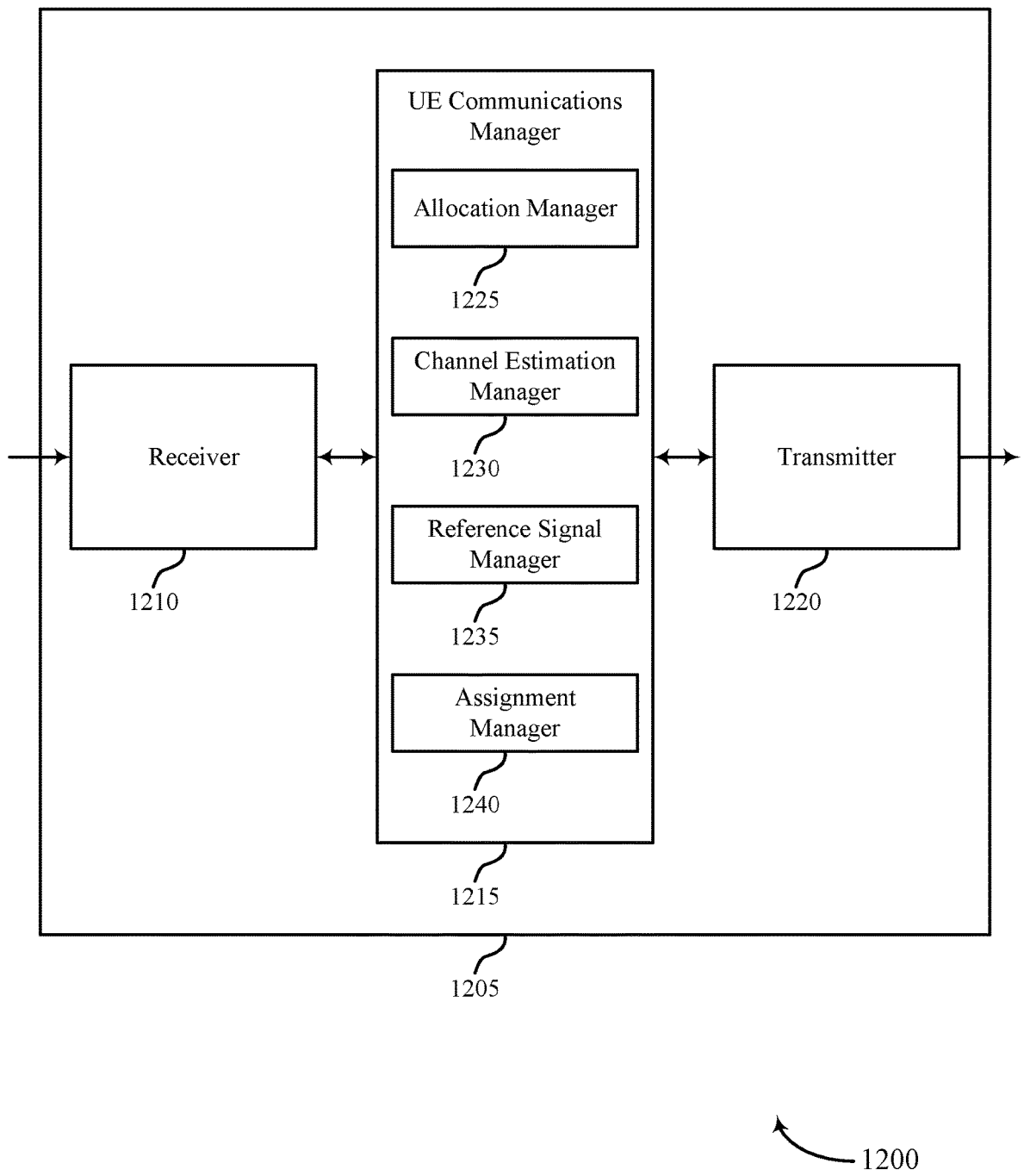

FIG. 12 shows a block diagram 1200 of a wireless device 1205 that supports techniques for channel estimation in accordance with aspects of the present disclosure. Wireless device 1205 may be an example of aspects of a wireless device 1105 or a UE 115 as described with reference to FIG. 11. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to techniques for channel estimation, etc.). Information may be passed on to other components of the device. The receiver 1210 may be an example of aspects of the transceiver 1435 described with reference to FIG. 14. The receiver 1210 may utilize a single antenna or a set of antennas.

UE communications manager 1215 may be an example of aspects of the UE communications manager 1415 described with reference to FIG. 14. UE communications manager 1215 may also include allocation manager 1225, channel estimation manager 1230, reference signal manager 1235, and assignment manager 1240.

Allocation manager 1225 may identify, by a UE, an allocation of a set of CSI-RS REs of a TTI to a port of the UE, identify that at least two CSI-RS REs of the set of CSI-RS REs allocated to the port of the UE are in different symbols of the TTI, where performing the channel estimation is based on identifying that the at least two CSI-RS REs are in different symbols of the TTI, identify that at least two CSI-RS REs of the set of CSI-RS REs allocated to the port of the UE are in different radio frequency spectrum bands of the TTI, where performing the channel estimation is based on identifying that the at least two CSI-RS REs are in different radio frequency spectrum bands of the TTI, and identify that the at least two CSI-RS REs allocated to the port of the UE are in different symbols of the TTI, where performing the channel estimation is based on identifying that the at least two CSI-RS REs are in different symbols of the TTI. In some examples, a ratio of CSI-RS REs in the TTI allocated to the UE and a number of ports of the UE is greater than one-to-one.

Channel estimation manager 1230 may perform a channel estimation using the set of CSI-RS REs allocated to the port of the UE based on identifying the allocation of the set CSI-RS REs to the port of the UE and identify a channel estimation accuracy for a communication with a base station, where assigning the set of symbols is based on identifying the channel estimation accuracy.

Reference signal manager 1235 may determine a set of SRSs for transmitting during a TTI and determine a number of transmissions of the set of SRSs in the TTI, where assigning the set of symbols is based on determining the number of transmissions.

Assignment manager 1240 may assign a set of symbols of the TTI for transmitting the set of SRSs based on determining the set of SRSs. In some examples, assigning the set of symbols of the TTI may include assigning the set of symbols of the TTI on an sTTI-by-sTTI basis. In some examples, the set of SRSs are associated with a first channel for URLLC, the first channel having a first channel length. In some examples, assigning a set of symbols of the TTI may include assigning the set of symbols of the TTI on a symbol-by-symbol basis.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
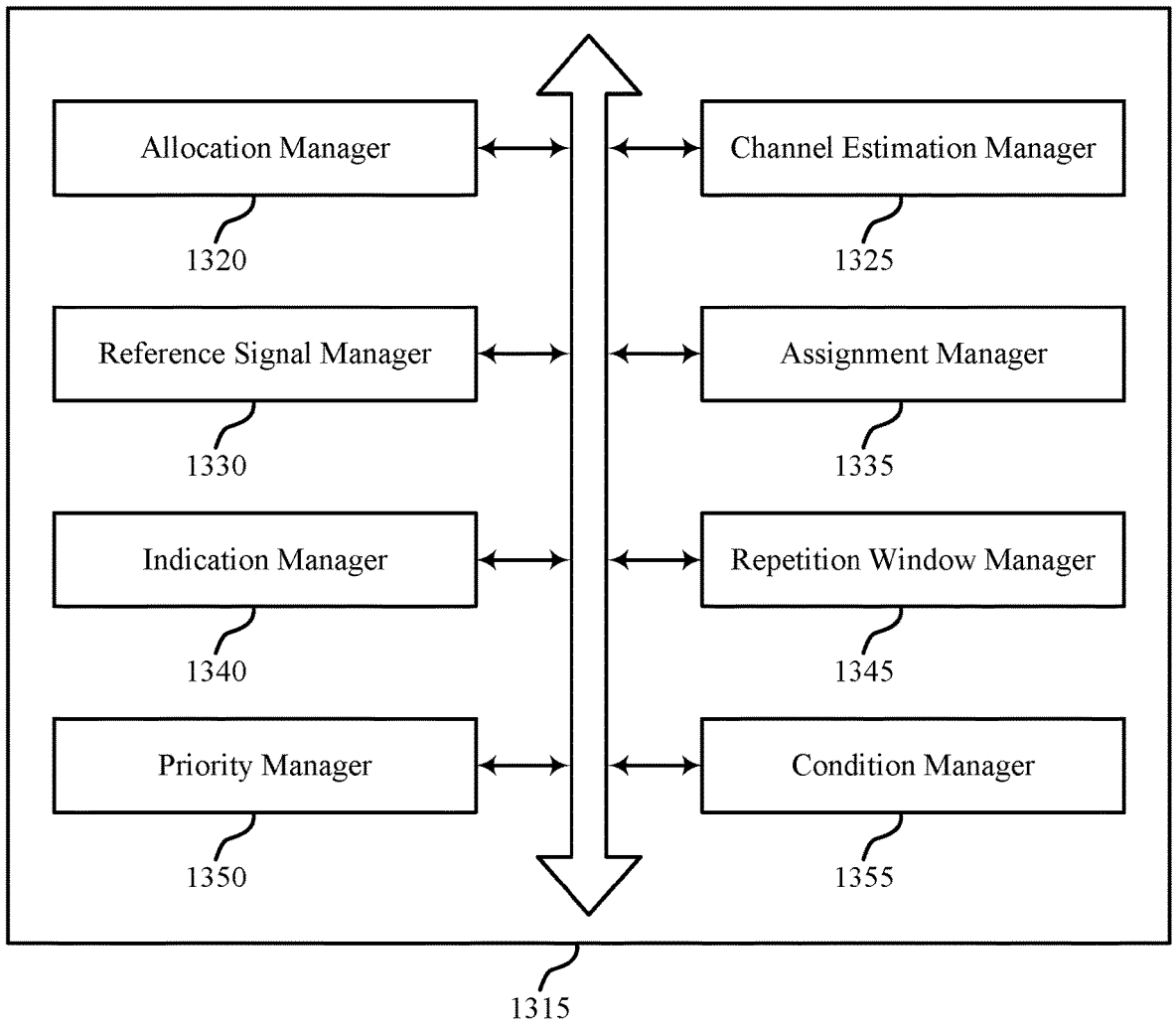

FIG. 13 shows a block diagram 1300 of a UE communications manager 1315 that supports techniques for channel estimation in accordance with aspects of the present disclosure. The UE communications manager 1315 may be an example of aspects of a UE communications manager 1415 described with reference to FIGS. 11, 12, and 14. The UE communications manager 1315 may include allocation manager 1320, channel estimation manager 1325, reference signal manager 1330, assignment manager 1335, indication manager 1340, repetition window manager 1345, priority manager 1350, and condition manager 1355. Each of these modules may communicate, directly or indirectly, with one another (e.g., via one or more buses).

Allocation manager 1320 may identify, by a UE, an allocation of a set of CSI-RS REs of a TTI to a port of the UE, identify that at least two CSI-RS REs of the set of CSI-RS REs allocated to the port of the UE are in different symbols of the TTI, where performing the channel estimation is based on identifying that the at least two CSI-RS REs are in different symbols of the TTI, identify that at least two CSI-RS REs of the set of CSI-RS REs allocated to the port of the UE are in different radio frequency spectrum bands of the TTI, where performing the channel estimation is based on identifying that the at least two CSI-RS REs are in different radio frequency spectrum bands of the TTI, and identify that the at least two CSI-RS REs allocated to the port of the UE are in different symbols of the TTI, where performing the channel estimation is based on identifying that the at least two CSI-RS REs are in different symbols of the TTI. In some examples, a ratio of CSI-RS REs in the TTI allocated to the UE and a number of ports of the UE is greater than one-to-one.

Channel estimation manager 1325 may perform a channel estimation using the set of CSI-RS REs allocated to the port of the UE based on identifying the allocation of the set CSI-RS REs to the port of the UE and identify a channel estimation accuracy for a communication with a base station, where assigning the set of symbols is based on identifying the channel estimation accuracy.

Reference signal manager 1330 may determine a set of SRSs for transmitting during a TTI and determine a number of transmissions of the set of SRSs in the TTI, where assigning the set of symbols is based on determining the number of transmissions.

Assignment manager 1335 may assign a set of symbols of the TTI for transmitting the set of SRSs based on determining the set of SRSs. In some examples, assigning the set of symbols of the TTI may include assigning the set of symbols of the TTI on an sTTI-by-sTTI basis. In some examples, the set of SRSs are associated with a first channel for URLLC, the first channel having a first channel length. In some examples, assigning a set of symbols of the TTI may include assigning the set of symbols of the TTI on a symbol-by-symbol basis.

Indication manager 1340 may receive an indication from the base station of the set of CSI-RS REs allocated to the port of the UE, where identifying the allocation of the set of CSI-RS REs to the port of the UE is based on receiving the indication. In some examples, the indication is included in an RRC message received from the base station.

Repetition window manager 1345 may generate a repetition window indicating a number of symbols to use to transmit the set of SRSs, where assigning the set of symbols is based on the repetition window. In some examples, the repetition window includes a first portion of symbols in a first subframe and a second portion of symbols in a second subframe, and where transmitting the set of SRSs may include transmitting the set of SRSs in a set of subframes that include the first subframe and the second subframe.

Priority manager 1350 may identify a second channel having a second channel length longer than the first channel length, where the second channel including information for transmitting using at least some of the same symbols as the set of SRSs, determine at least some content of the information for transmitting using the second channel, where transmitting the set of SRSs is based on determining the at least some content of the information to be transmitted using the second channel, identify a second channel having a second channel length equal to the first channel length, the second channel including information to be transmitted using at some of the same symbols as the set of SRSs, apply one or more power scaling rules to the set of SRSs based at least in least in part on identifying that the second channel has the second channel length equal to the first channel length, where transmitting the set of SRSs is based on applying the one or more power scaling rules, determine at least some content of the information to be transmitted using the second channel, where transmitting the set of SRSs is based on determining the at least some content of the information to be transmitted using the second channel, and apply the one or more power scaling rules to the set of SRSs is based on the content of the second channel including an acknowledgement or a negative acknowledgement of a hybrid automatic repeat request (HARQ), a demodulation reference signal (DMRS), or a combination thereof. In some examples, the set of SRSs are transmitted based on the content of the second channel being exclusive of an acknowledgement or a negative acknowledgement of a HARQ, a demodulation reference signal (DMRS), or a combination thereof.

Condition manager 1355 may identify a channel condition of a communication link with a base station, where assigning the set of symbols is based on identifying the channel condition.

Figure 14:
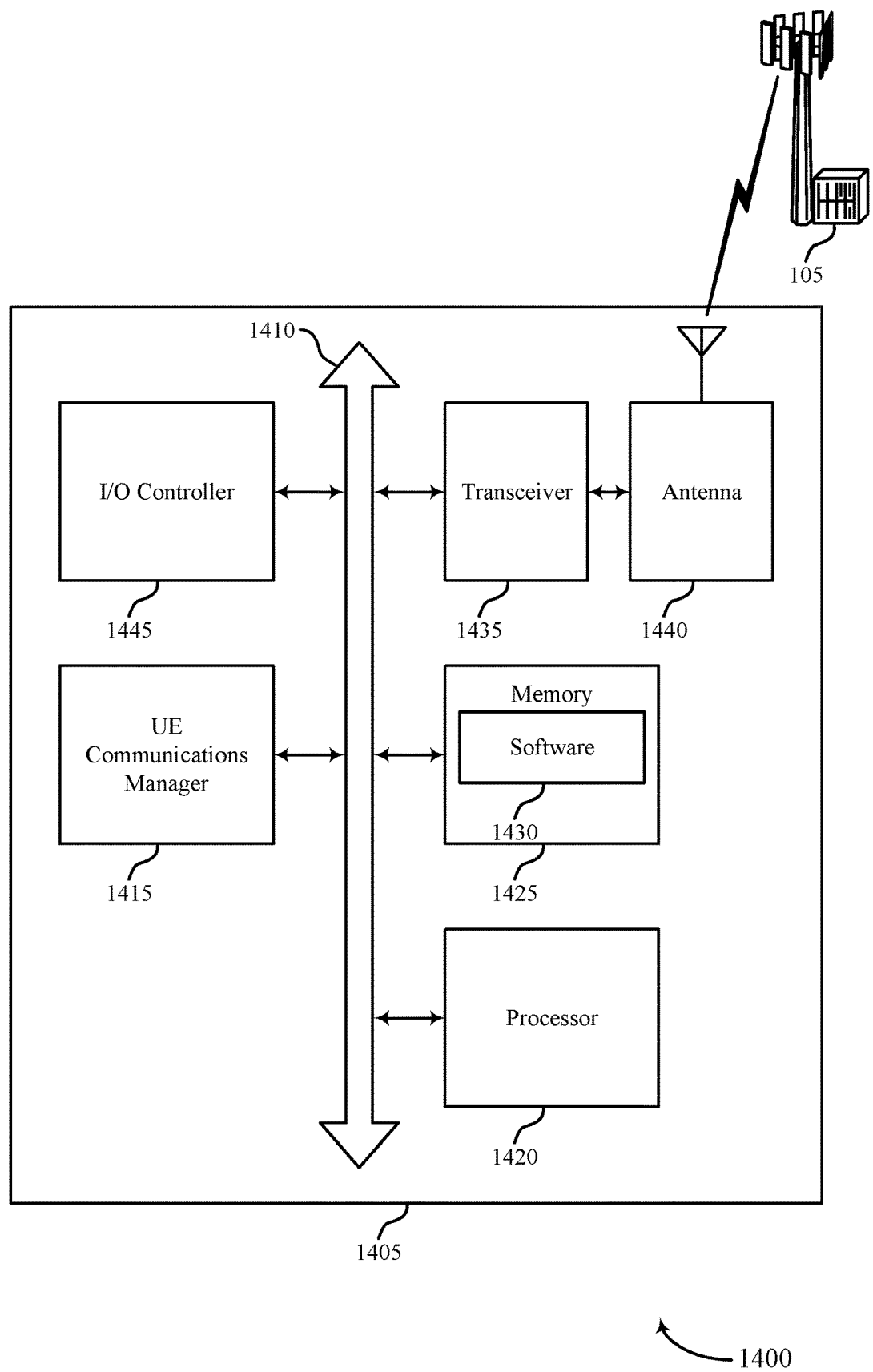
FIG. 14 illustrates a block diagram of a system including a UE that supports techniques for channel estimation in accordance with aspects of the present disclosure.

FIG. 14 shows a diagram of a system 1400 including a device 1405 that supports techniques for channel estimation in accordance with aspects of the present disclosure. Device 1405 may be an example of or include the components of UE 115 as described above, e.g., with reference to FIG. 1. Device 1405 may include components for bi-directional voice and data communications including components for transmitting and receiving communications, including UE communications manager 1415, processor 1420, memory 1425, software 1430, transceiver 1435, antenna 1440, and I/O controller 1445. These components may be in electronic communication via one or more buses (e.g., bus 1410). Device 1405 may communicate wirelessly with one or more base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting techniques for channel estimation).

Memory 1425 may include RAM and ROM. The memory 1425 may store computer-readable, computer-executable software 1430 including instructions that, when executed, cause the processor to perform various functions described herein. In some examples, the memory 1425 may contain, among other things, a BIOS which may control basic hardware or software operation such as the interaction with peripheral components or devices.

Software 1430 may include code to implement aspects of the present disclosure, including code to support techniques for channel estimation. Software 1430 may be stored in a non-transitory computer-readable medium such as system memory or other memory. In some examples, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some examples, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some examples, I/O controller 1445 may represent a physical connection or port to an external peripheral. In some examples, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some examples, I/O controller 1445 may be implemented as part of a processor. In some examples, a user may interact with device 1405 via I/O controller 1445 or via hardware components controlled by I/O controller 1445.

Figure 15:
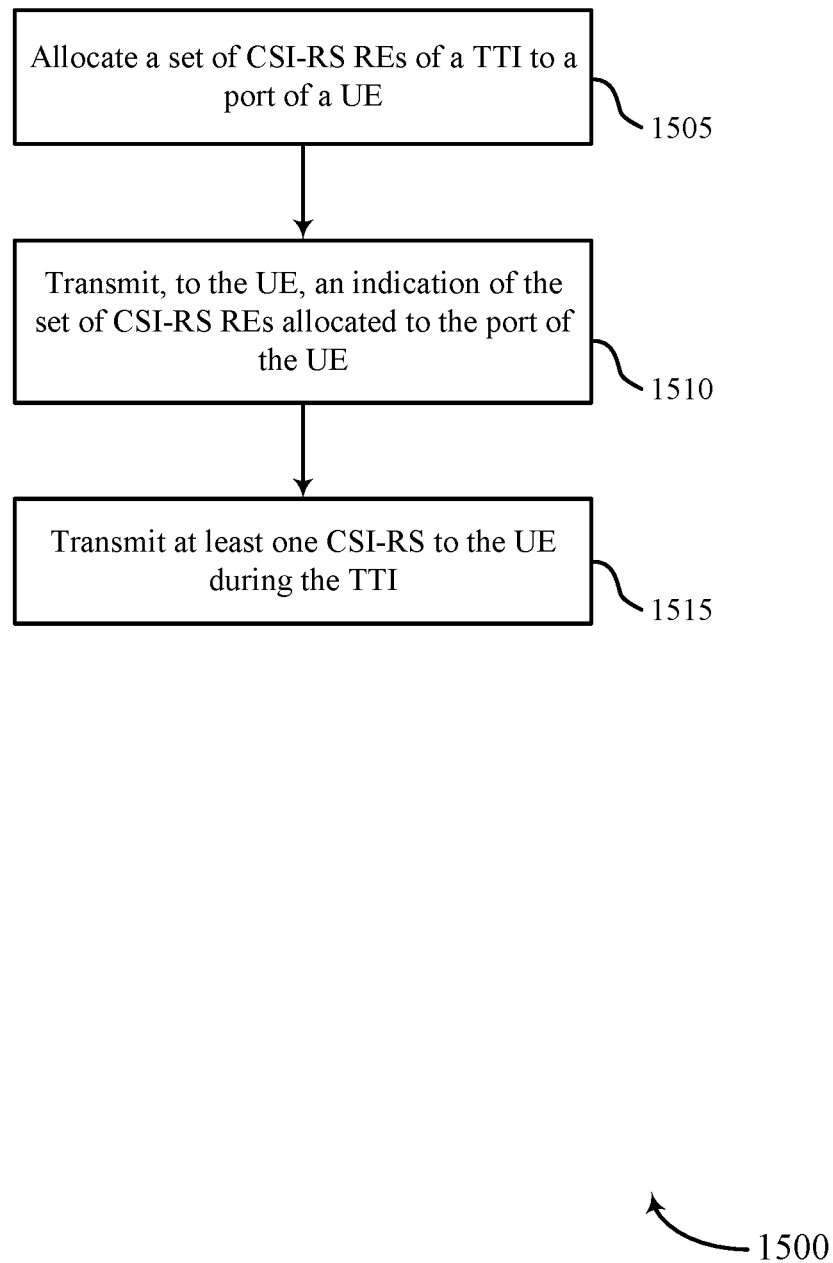
FIGS. 15 through 21 illustrate methods for techniques for channel estimation in accordance with aspects of the present disclosure.

FIG. 15 shows a flowchart illustrating a method 1500 for techniques for channel estimation in accordance with aspects of the present disclosure. The operations of method 1500 may be implemented by a base station 105 or its components as described herein. For example, the operations of method 1500 may be performed by a base station communications manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At 1505 the base station 105 may allocate a plurality of CSI-RS REs of a TTI to a port of a UE. The operations of 1505 may be performed according to the methods described herein. In certain examples, aspects of the operations of 1505 may be performed by an allocation manager as described with reference to FIGS. 7 through 10.

At 1510 the base station 105 may transmit, to the UE, an indication of the plurality of CSI-RS REs allocated to the port of the UE. The operations of 1510 may be performed according to the methods described herein. In certain examples, aspects of the operations of 1510 may be performed by a transmitter as described with reference to FIGS. 7 through 10.

At 1515 the base station 105 may transmit at least one CSI-RS to the UE during the TTI. The operations of 1515 may be performed according to the methods described herein. In certain examples, aspects of the operations of 1515 may be performed by a transmitter as described with reference to FIGS. 7 through 10.

Figure 16:
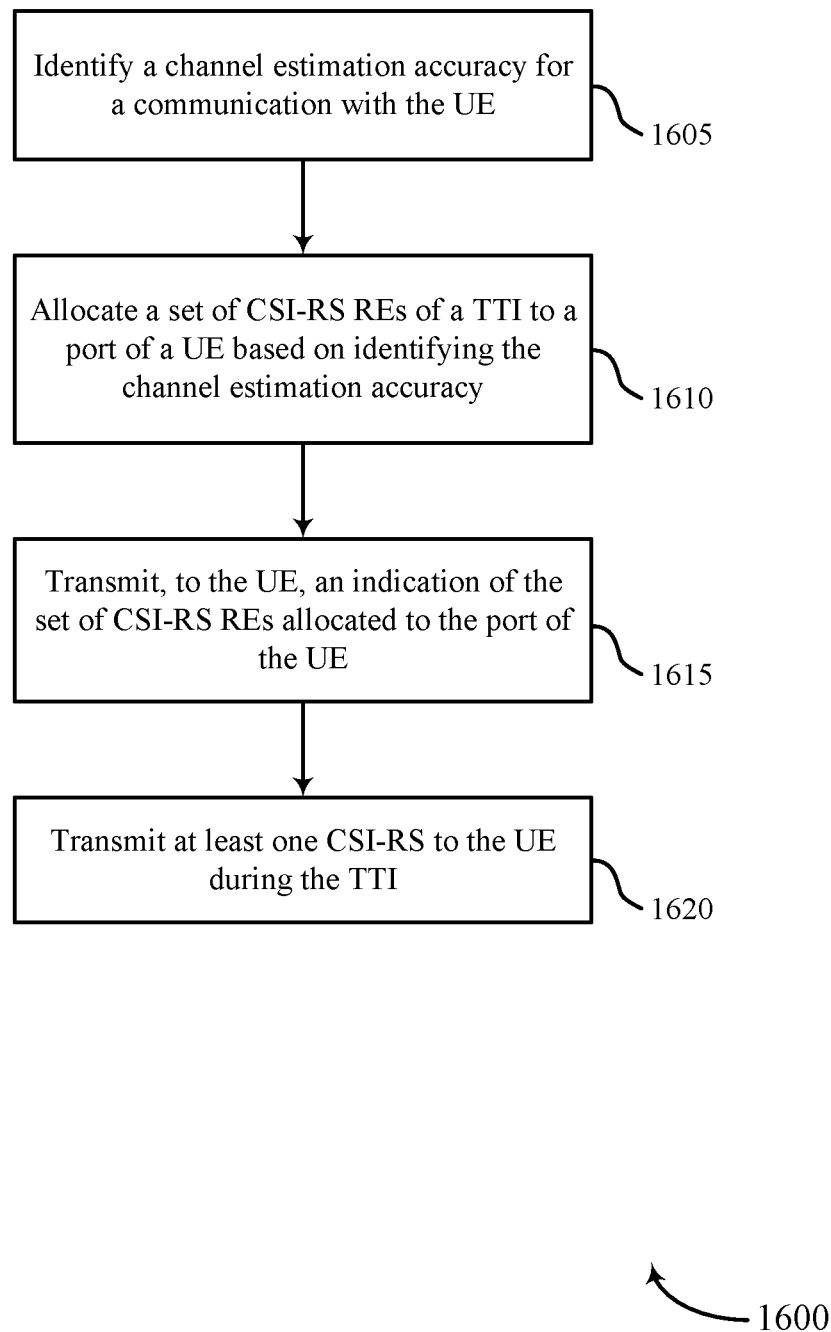

FIG. 16 shows a flowchart illustrating a method 1600 for techniques for channel estimation in accordance with aspects of the present disclosure. The operations of method 1600 may be implemented by a base station 105 or its components as described herein. For example, the operations of method 1600 may be performed by a base station communications manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may identify a channel estimation accuracy for a communication with the UE, where allocating the plurality of CSI-RS REs to the port of the UE is based at least in part on identifying the channel estimation accuracy. The operations of 1605 may be performed according to the methods described herein. In certain examples, aspects of the operations of 1605 may be performed by a channel estimation manager as described with reference to FIGS. 7 through 10.

At 1610 the base station 105 may allocate a plurality of CSI-RS REs of a TTI to a port of a UE. The operations of 1610 may be performed according to the methods described herein. In certain examples, aspects of the operations of 1610 may be performed by an allocation manager as described with reference to FIGS. 7 through 10.

At 1615 the base station 105 may transmit, to the UE, an indication of the plurality of CSI-RS REs allocated to the port of the UE. The operations of 1615 may be performed according to the methods described herein. In certain examples, aspects of the operations of 1615 may be performed by a transmitter as described with reference to FIGS. 7 through 10.

At 1620 the base station 105 may transmit at least one CSI-RS to the UE during the TTI. The operations of 1620 may be performed according to the methods described herein. In certain examples, aspects of the operations of 1620 may be performed by a transmitter as described with reference to FIGS. 7 through 10.

Figure 17:
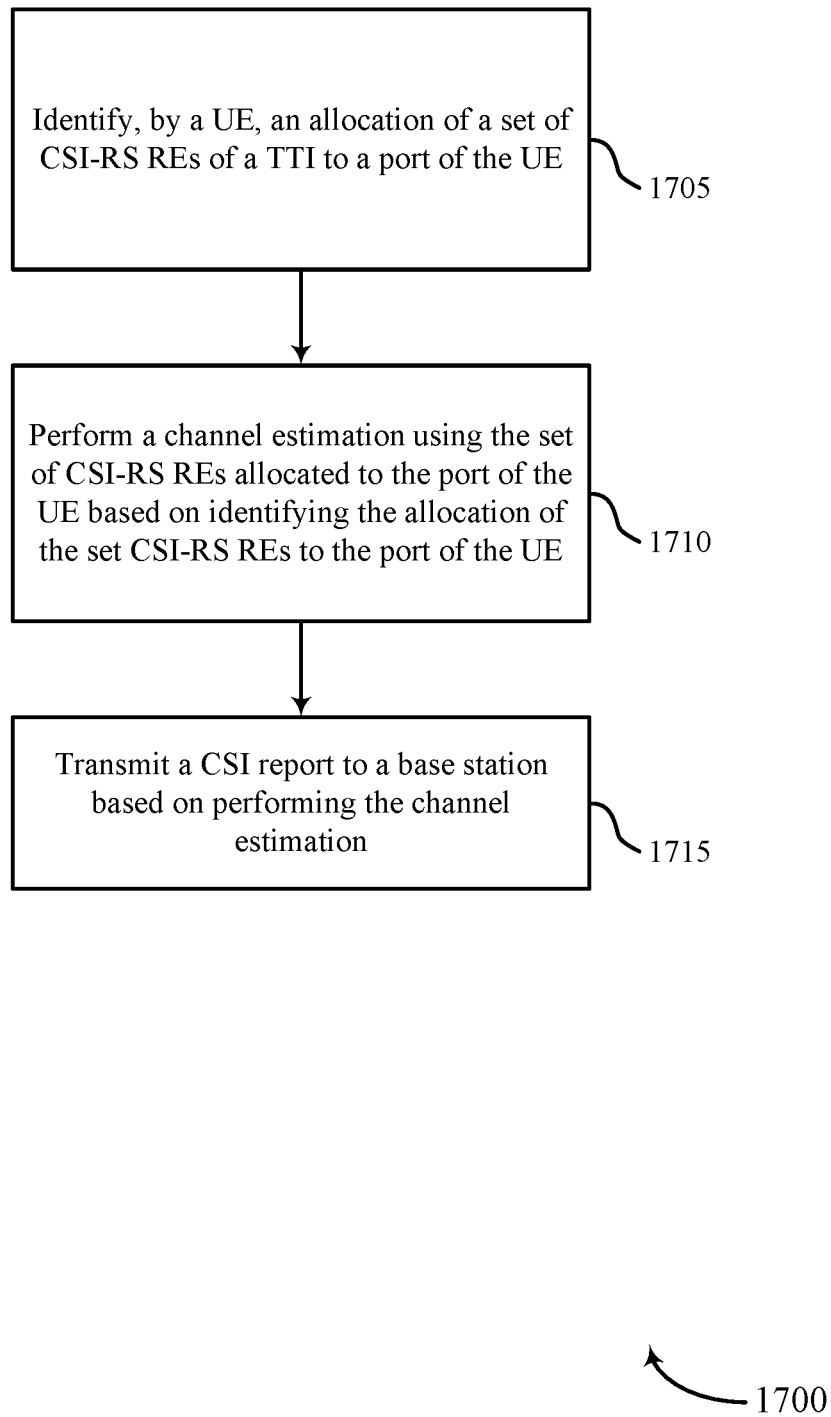

FIG. 17 shows a flowchart illustrating a method 1700 for techniques for channel estimation in accordance with aspects of the present disclosure. The operations of method 1700 may be implemented by a UE 115 or its components as described herein. For example, the operations of method 1700 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may identify, by a UE, an allocation of a plurality of CSI-RS REs of a TTI to a port of the UE. The operations of 1705 may be performed according to the methods described herein. In certain examples, aspects of the operations of 1705 may be performed by an allocation manager as described with reference to FIGS. 11 through 14.

At 1710 the UE 115 may perform a channel estimation using the plurality of CSI-RS REs allocated to the port of the UE based at least in part on identifying the allocation of the plurality CSI-RS REs to the port of the UE. The operations of 1710 may be performed according to the methods described herein. In certain examples, aspects of the operations of 1710 may be performed by a channel estimation manager as described with reference to FIGS. 11 through 14.

At 1715 the UE 115 may transmit a channel state information (CSI) report to a base station based at least in part on performing the channel estimation. The operations of 1715 may be performed according to the methods described herein. In certain examples, aspects of the operations of 1715 may be performed by a transmitter as described with reference to FIGS. 11 through 14.

Figure 18:
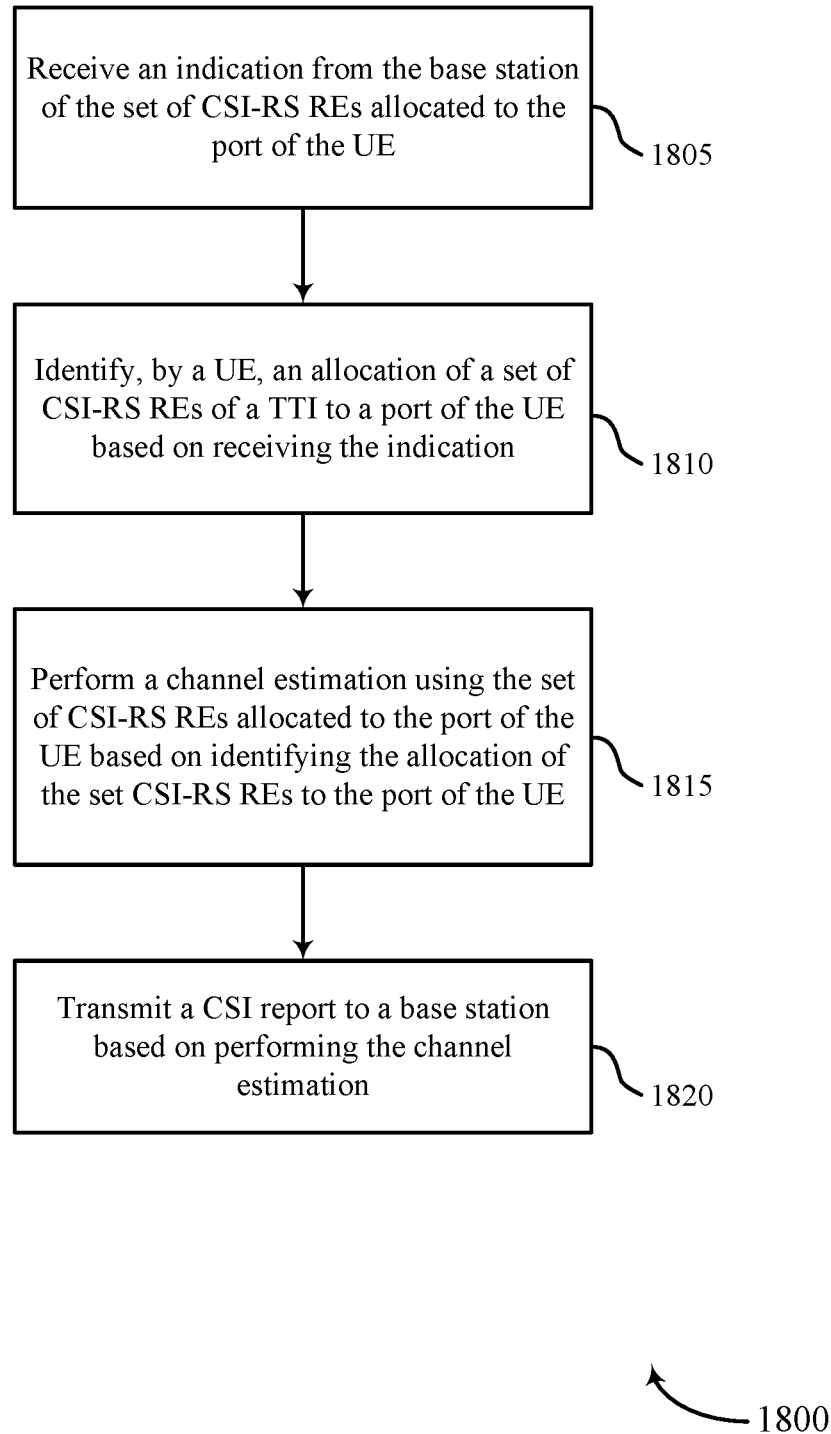

FIG. 18 shows a flowchart illustrating a method 1800 for techniques for channel estimation in accordance with aspects of the present disclosure. The operations of method 1800 may be implemented by a UE 115 or its components as described herein. For example, the operations of method 1800 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may receive an indication from the base station of the plurality of CSI-RS REs allocated to the port of the UE. The operations of 1805 may be performed according to the methods described herein. In certain examples, aspects of the operations of 1805 may be performed by an indication manager as described with reference to FIGS. 11 through 14.

At 1810 the UE 115 may identify, by a UE, an allocation of a plurality of CSI-RS REs of a TTI to a port of the UE based at least in part on receiving the indication. The operations of 1810 may be performed according to the methods described herein. In certain examples, aspects of the operations of 1810 may be performed by an allocation manager as described with reference to FIGS. 11 through 14.

At 1815 the UE 115 may perform a channel estimation using the plurality of CSI-RS REs allocated to the port of the UE based at least in part on identifying the allocation of the plurality CSI-RS REs to the port of the UE. The operations of 1815 may be performed according to the methods described herein. In certain examples, aspects of the operations of 1815 may be performed by a channel estimation manager as described with reference to FIGS. 11 through 14.

At 1820 the UE 115 may transmit a channel state information (CSI) report to a base station based at least in part on performing the channel estimation. The operations of 1820 may be performed according to the methods described herein. In certain examples, aspects of the operations of 1820 may be performed by a transmitter as described with reference to FIGS. 11 through 14.

Figure 19:
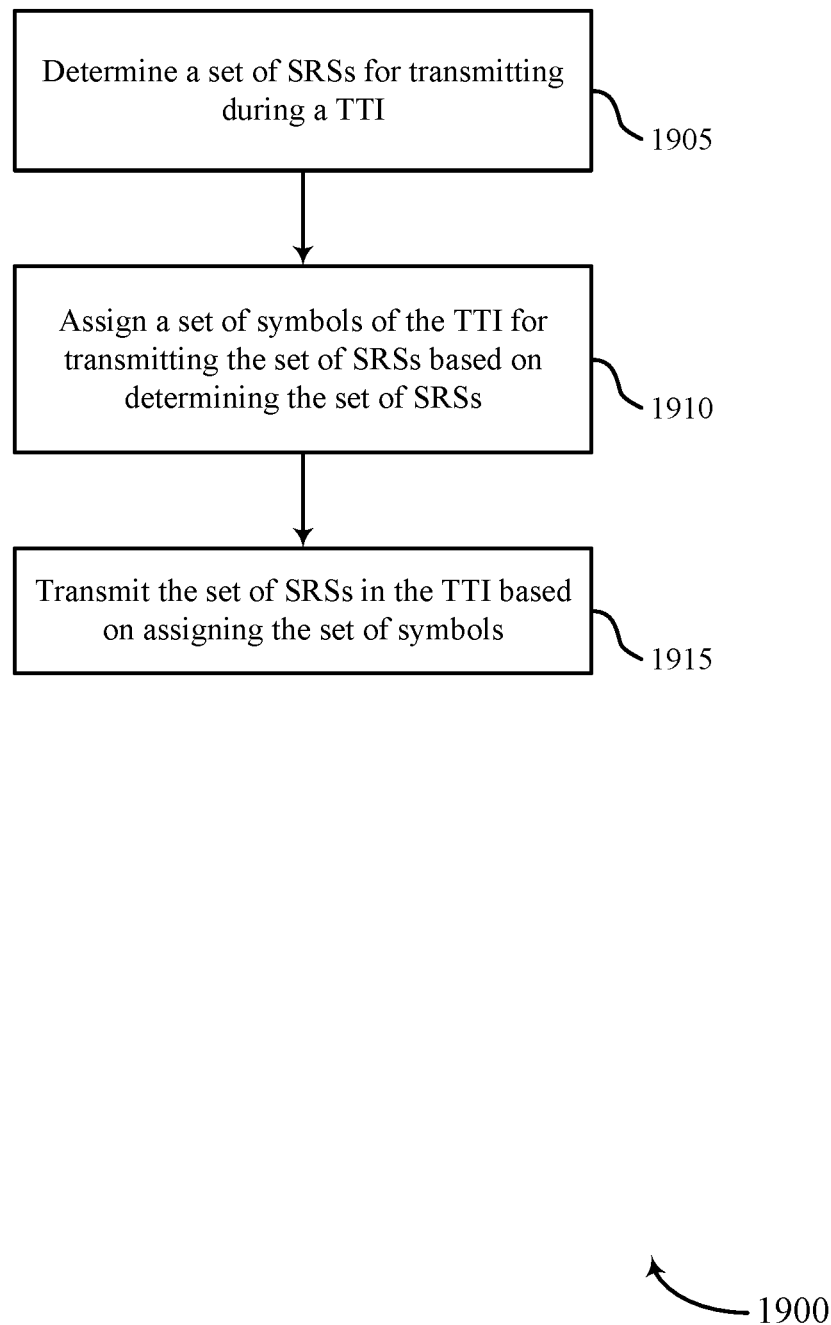

FIG. 19 shows a flowchart illustrating a method 1900 for techniques for channel estimation in accordance with aspects of the present disclosure. The operations of method 1900 may be implemented by a UE 115 or its components as described herein. For example, the operations of method 1900 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 1905 the UE 115 may determine a plurality of SRSs for transmitting during a TTI. The operations of 1905 may be performed according to the methods described herein. In certain examples, aspects of the operations of 1905 may be performed by a reference signal manager as described with reference to FIGS. 11 through 14.

At 1910 the UE 115 may assign a plurality of symbols of the TTI for transmitting the plurality of SRSs based at least in part on determining the plurality of SRSs. The operations of 1910 may be performed according to the methods described herein. In certain examples, aspects of the operations of 1910 may be performed by an assignment manager as described with reference to FIGS. 11 through 14.

At 1915 the UE 115 may transmit the plurality of SRSs in the TTI based at least in part on assigning the plurality of symbols. The operations of 1915 may be performed according to the methods described herein. In certain examples, aspects of the operations of 1915 may be performed by a transmitter as described with reference to FIGS. 11 through 14.

Figure 20:
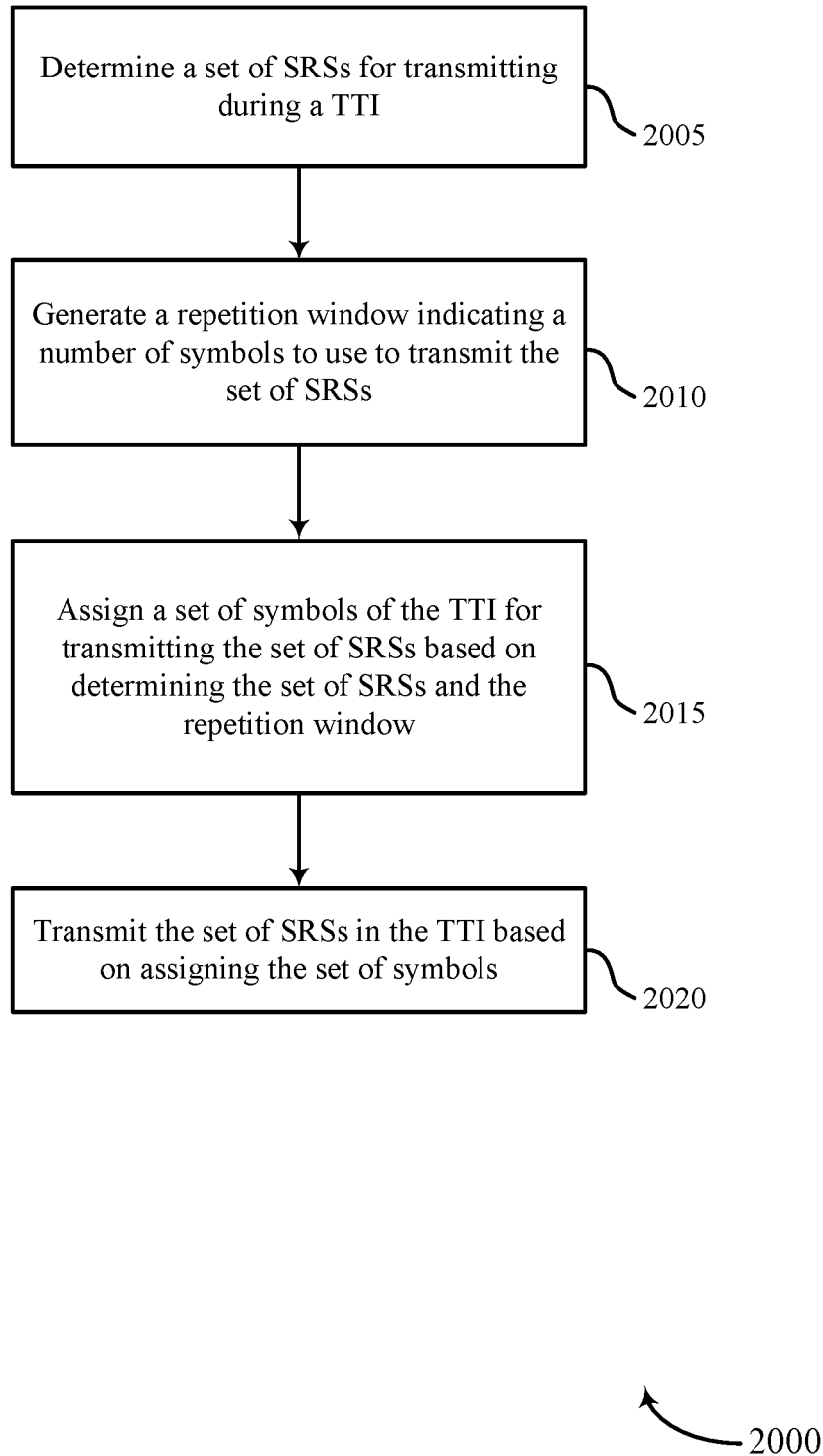

FIG. 20 shows a flowchart illustrating a method 2000 for techniques for channel estimation in accordance with aspects of the present disclosure. The operations of method 2000 may be implemented by a UE 115 or its components as described herein. For example, the operations of method 2000 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 2005 the UE 115 may determine a plurality of SRSs for transmitting during a TTI. The operations of 2005 may be performed according to the methods described herein. In certain examples, aspects of the operations of 2005 may be performed by a reference signal manager as described with reference to FIGS. 11 through 14.

At 2010 the UE 115 may generate a repetition window indicating a number of symbols to use to transmit the plurality of SRSs. The operations of 2010 may be performed according to the methods described herein. In certain examples, aspects of the operations of 2010 may be performed by a repetition window manager as described with reference to FIGS. 11 through 14.

At 2015 the UE 115 may assign a plurality of symbols of the TTI for transmitting the plurality of SRSs based at least in part on determining the plurality of SRSs and the repetition window. The operations of 2015 may be performed according to the methods described herein. In certain examples, aspects of the operations of 2015 may be performed by an assignment manager as described with reference to FIGS. 11 through 14.

At 2020 the UE 115 may transmit the plurality of SRSs in the TTI based at least in part on assigning the plurality of symbols. The operations of 2020 may be performed according to the methods described herein. In certain examples, aspects of the operations of 2020 may be performed by a transmitter as described with reference to FIGS. 11 through 14.

Figure 21:
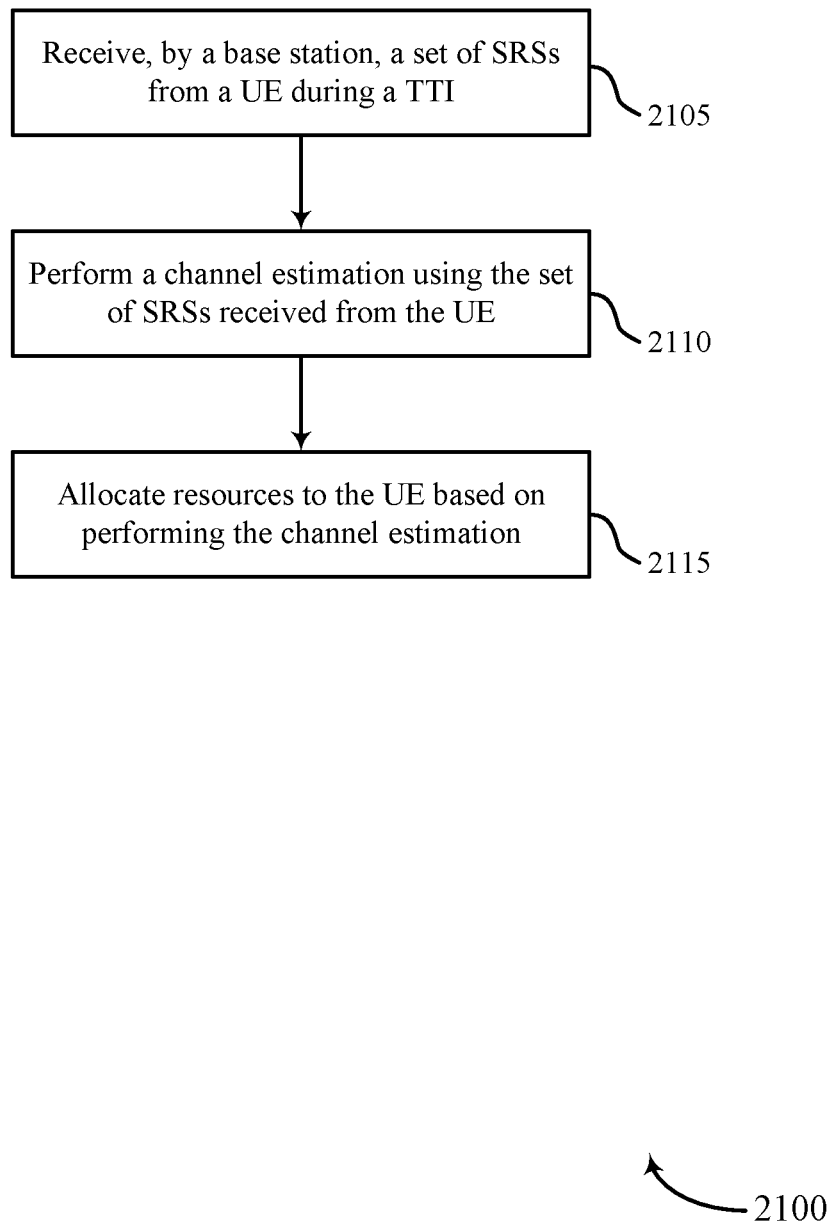

FIG. 21 shows a flowchart illustrating a method 2100 for techniques for channel estimation in accordance with aspects of the present disclosure. The operations of method 2100 may be implemented by a base station 105 or its components as described herein. For example, the operations of method 2100 may be performed by a base station communications manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At 2105 the base station 105 may receive, by a base station, a plurality of SRSs from a UE during a TTI. The operations of 2105 may be performed according to the methods described herein. In certain examples, aspects of the operations of 2105 may be performed by a receiver as described with reference to FIGS. 7 through 10.

At 2110 the base station 105 may perform a channel estimation using the plurality of SRSs received from the UE. The operations of 2110 may be performed according to the methods described herein. In certain examples, aspects of the operations of 2110 may be performed by a channel estimation manager as described with reference to FIGS. 7 through 10.

At 2115 the base station 105 may allocate resources to the UE based at least in part on performing the channel estimation. The operations of 2115 may be performed according to the methods described herein. In certain examples, aspects of the operations of 2115 may be performed by an allocation manager as described with reference to FIGS. 7 through 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, UTRA, etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a level of accuracy for a channel estimation to be performed by a base station, the channel estimation associated with at least one communication with the base station;
   determining a quantity of sounding reference signals (SRSs) for transmitting during a transmission time interval (TTI) based at least in part on the level of accuracy for the channel estimation;
   assigning a plurality of symbols within a repetition window of the TTI, wherein the repetition window indicates a number of symbols used for transmitting the quantity of SRSs, and wherein assigning the plurality of symbols is based at least in part on determining the quantity of SRSs and on the level of accuracy for the channel estimation; and
   transmitting the quantity of SRSs in the TTI based at least in part on assigning the plurality of symbols.

2. The method of claim 1, wherein assigning the plurality of symbols of the TTI comprises:
   assigning the plurality of symbols of the TTI on a short TTI (sTTI)-by-sTTI basis.

3. The method of claim 1, further comprising:
   generating the repetition window indicating the number of symbols to use to transmit the quantity of SRSs, wherein assigning the plurality of symbols is based at least in part on generating the repetition window.

4. The method of claim 3, wherein the repetition window comprises a first portion of symbols in a first subframe and a second portion of symbols in a second subframe, and wherein transmitting the quantity of SRSs comprises:
   transmitting the quantity of SRSs in a plurality of subframes that comprise the first subframe and the second subframe.

5. The method of claim 1, wherein the quantity of SRSs is associated with a first channel for ultra-reliable low-latency communications (URLLC), the first channel having a first channel length.

6. The method of claim 5, further comprising:
   identifying a second channel having a second channel length longer than the first channel length, wherein the second channel includes information to be transmitted using at least one same symbol as the quantity of SRSs; and
   determining a content of the information to be transmitted using the second channel, wherein transmitting the quantity of SRSs is based at least in part on determining the content of the information to be transmitted using the second channel.

7. The method of claim 6, wherein the quantity of SRSs is transmitted based at least in part on the content of the second channel being exclusive of an acknowledgement or a negative acknowledgement of a hybrid automatic repeat request (HARQ), a demodulation reference signal (DMRS), or a combination thereof.

8. The method of claim 5, further comprising:
identifying a second channel having a second channel length equal to the first channel length, the second channel including information to be transmitted using at least one same symbol as the quantity of SRSs;
applying one or more power scaling rules to the quantity of SRSs based at least in least in part on identifying that the second channel has the second channel length equal to the first channel length, wherein transmitting the quantity of SRSs is based at least in part on applying the one or more power scaling rules; and
determining a content of the information to be transmitted using the second channel, wherein transmitting the quantity of SRSs is based at least in part on determining the content of the information to be transmitted using the second channel.

9. The method of claim 8, further comprising:
applying the one or more power scaling rules to the quantity of SRSs is based at least in part on the content of the second channel including an acknowledgement or a negative acknowledgement of a hybrid automatic repeat request (HARQ), a demodulation reference signal (DMRS), or a combination thereof.

10. The method of claim 1, further comprising:
receiving downlink control information from the base station, wherein determining to transmit the quantity of SRSs is based at least in part on receiving the downlink control information.

11. The method of claim 10, wherein the downlink control information comprises short downlink control information associated with ultra-reliable low-latency communications (URLLC).

12. The method of claim 1, further comprising:
determining a number of transmissions of the quantity of SRSs in the TTI, wherein assigning the plurality of symbols is based at least in part on determining the number of transmissions.

13. The method of claim 1, further comprising:
identifying a channel condition of a communication link with the base station, wherein assigning the plurality of symbols is based at least in part on identifying the channel condition.

14. A method for wireless communication, comprising:
identifying a level of accuracy for a channel estimation to be performed by a base station, the channel estimation associated with at least one communication with a user equipment (UE);
receiving, by the base station, a quantity of sounding reference signals (SRSs) from the UE during a transmission time interval (TTI) based at least in part on the level of accuracy for the channel estimation;
receiving the quantity of SRSs via a plurality of symbols within a repetition window of the TTI, wherein the repetition window indicates a number of symbols used for receiving the quantity of SRSs, and wherein the plurality of symbols is based at least in part on the level of accuracy for the channel estimation;
performing the channel estimation based at least in part on receiving the quantity of SRSs from the UE; and
allocating resources to the UE based at least in part on performing the channel estimation.

15. The method of claim 14, further comprising:
receiving a first set of SRSs of the quantity of SRSs in a first subframe and a second set of SRSs of the quantity of SRSs in a second subframe, wherein performing the channel estimation is based at least in part on the first set of SRSs in the first subframe and the second set of SRSs in the second subframe.

16. The method of claim 14, wherein the plurality of symbols of the TTI are assigned on a short TTI (sTTI)-by-sTTI basis.

17. The method of claim 14, further comprising:
transmitting downlink control information to the UE, wherein determining the quantity of SRSs for transmitting is based at least in part on transmitting the downlink control information.

18. The method of claim 17, wherein the downlink control information comprises short downlink control information.

19. An apparatus for wireless communication, comprising:
one or more memories storing processor-executable code; and
one or more processors coupled with the one or more memories and operable to execute the code to cause the apparatus to:
identify a level of accuracy for a channel estimation to be performed by a base station, the channel estimation associated with at least one communication with the base station;
determine a quantity of sounding reference signals (SRSs) for transmitting during a transmission time interval (TTI) based at least in part on the level of accuracy for the channel estimation;
assign a plurality of symbols within a repetition window of the TTI, wherein the repetition window indicates a number of symbols used for transmitting the quantity of SRSs, and wherein assigning the plurality of symbols is based at least in part on determining the quantity of SRSs and on the level of accuracy for the channel estimation; and
transmit the quantity of SRSs in the TTI based at least in part on assigning the plurality of symbols.

* * * * *